(12) United States Patent
Deguchi et al.

(10) Patent No.: US 6,687,581 B2
(45) Date of Patent: Feb. 3, 2004

(54) CONTROL DEVICE AND CONTROL METHOD FOR HYBRID VEHICLE

(75) Inventors: Yoshitaka Deguchi, Yokohama (JP); Kouichi Kuroda, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/060,162

(22) Filed: Feb. 1, 2002

(65) Prior Publication Data

US 2002/0107618 A1 Aug. 8, 2002

(30) Foreign Application Priority Data

Feb. 7, 2001 (JP) .......................... 2001-031030

(51) Int. Cl.⁷ .................................................. G06F 7/00
(52) U.S. Cl. .......................................................... 701/22
(58) Field of Search ............................... 701/22, 23, 25, 701/200

(56) References Cited

U.S. PATENT DOCUMENTS 5,778,326 A   7/1998   Moroto et al. ................ 701/22

FOREIGN PATENT DOCUMENTS

JP         8-126116         5/1996

*Primary Examiner*—Yonel Beaulieu
(74) *Attorney, Agent, or Firm*—Foley & Lardner

(57) ABSTRACT

Along with detecting speed of a hybrid vehicle, a drive/brake power command value for the vehicle is set, and an efficiency indication which indicates the efficiency of fuel utilization is also set. An operational point for an internal combustion engine and an electric motor of the vehicle is determined which makes the amount of charge into a battery smaller, the greater is this efficiency indication, based upon the detected vehicle speed, and the drive/brake power command value and the efficiency indication. In this manner, it is possible to control the engine and the motor so as to bring the remaining amount of charge in the battery to a target value while keeping the fuel consumption over the route to be travelled as low as possible.

20 Claims, 14 Drawing Sheets

VEHICLE SPEED PATTERN
(ROAD SPEED + DRIVE POWER)

DURING DRIVING
WITH SOCc=SOC_h

DURING DRIVING
WITH SOCc=SOC_m

DURING DRIVING
WITH SOCc=SOC_l

12T CONTROL DEVICE AND CONTROL METHOD FOR HYBRID VEHICLE

BACKGROUND OF THE INVENTION

1. Field of the Invention

The present invention relates to a control device for a hybrid vehicle which is propelled by a plurality of sources for drive power, and more particularly relates to such a control device which improves fuel consumption.

2. Description of the Related Art

A control device for a hybrid vehicle is known (refer to Japanese Laid-Open Patent Publication No. H8-126116) which is constituted so as to obtain information related to the route of travel from a navigation device, and so as to set the operational point for an internal combustion engine and an electric motor by setting a target value for battery remaining amount according to the route to be travelled.

SUMMARY OF THE INVENTION

However, the control device for a hybrid vehicle described in the above prior art only switches over the operational point of the internal combustion engine and the electric motor based upon the battery remaining amount during vehicle operation. In other words, if the battery remaining amount during vehicle operation becomes lower than the target value, then the operational point of the engine and the motor are switched over to the charge side, while, if the battery remaining amount during vehicle operation becomes higher than the target value, then the operational point of the engine and the motor are switched over to the charge stopped side or the discharge side. Accordingly, there is the problem with this conventional control device for a hybrid vehicle that the fuel consumption is not kept down to its minimum limit in terms of the route to be travelled, since no consideration is accorded to the influence which the road environment and the driving conditions of the route to be travelled exert upon the efficiencies of the engine and the motor.

Accordingly, it is an objective of the present invention to provide a control device and a control method for a hybrid vehicle, which control the internal combustion engine and the electric motor so that the battery remaining amount is brought to a target value, while keeping down the fuel consumption to its minimum limit in terms of the route to be travelled.

The control device for a hybrid vehicle according to the present invention is for controlling a hybrid vehicle which is propelled by either an internal combustion engine or an electric motor or both, and in which electrical power is transferred between the motor and a battery, and includes: a vehicle speed detection device which detects the speed of the vehicle; a drive/brake power command value setting device which sets a drive/brake power command value for the vehicle; an efficiency indication setting device which sets an efficiency indication which indicates the efficiency of utilization of fuel; and an operational point determination device which determines an operational point for the engine and the motor which makes the amount of charge into the battery smaller, the greater is the efficiency indication, based upon the vehicle speed which is detected by the vehicle speed detection device, the drive/brake power command value which is set by the drive/brake power command value setting device, and the efficiency indication which is set by the efficiency indication setting device.

And the control method for a hybrid vehicle according to the present invention is for controlling a hybrid vehicle which is propelled by either an internal combustion engine or an electric motor or both, and in which electrical power is transferred between the motor and a battery, and includes: detecting the speed of the vehicle; setting a drive/brake power command value for the vehicle; setting an efficiency indication which indicates the efficiency of utilization of fuel; and determining an operational point for the engine and the motor, which makes the amount of charge into the battery smaller, the greater is the efficiency indication, based upon the vehicle speed which is detected, and the drive/brake power command value and the efficiency indication which are set.

DETAILED DESCRIPTION OF THE PREFERRED EMBODIMENTS

—The First Preferred Embodiment—

Figure 1:
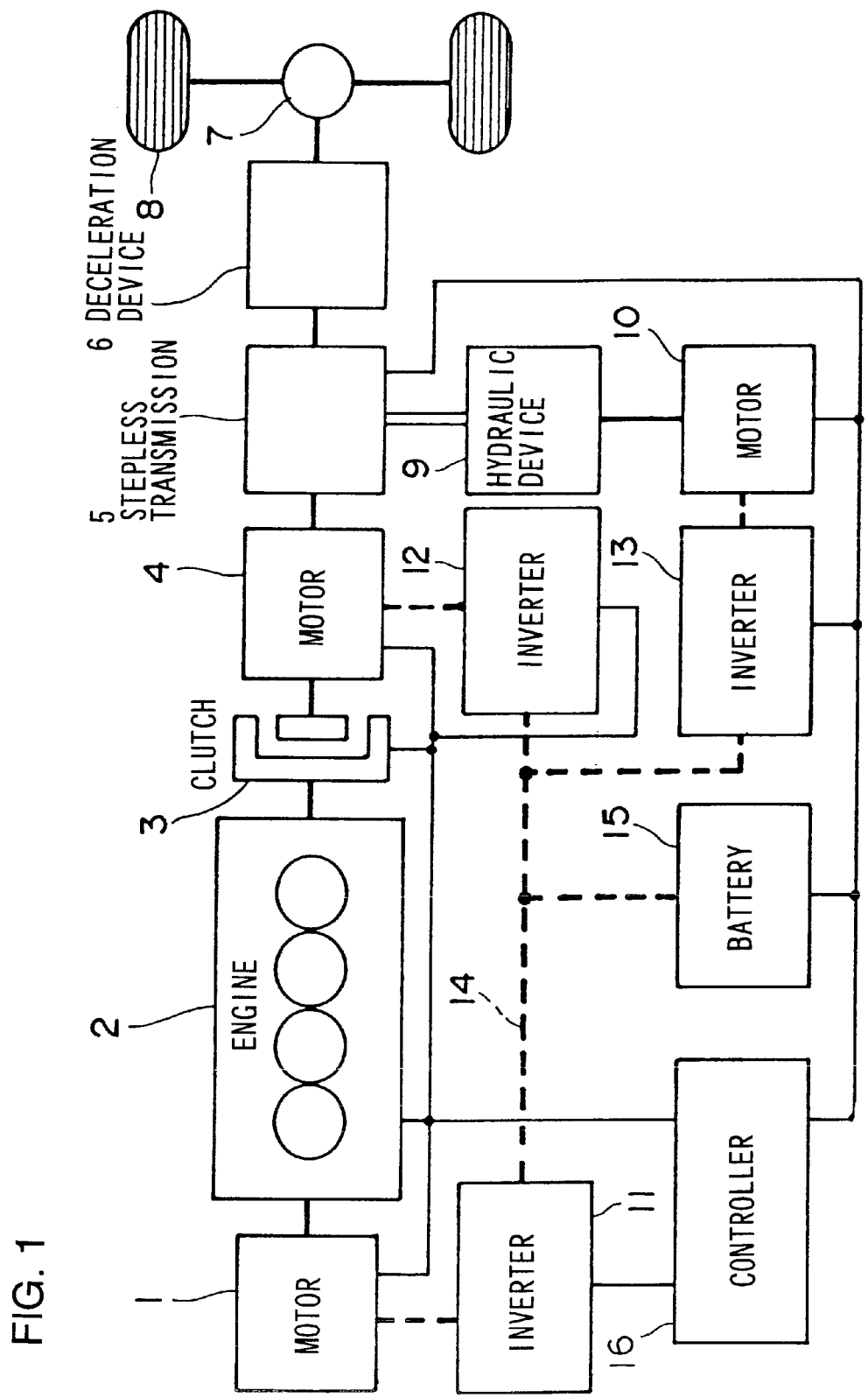
FIG. 1 is a figure showing the overall structure of a control device for a hybrid vehicle according to the present invention.

FIG. 1 is a figure showing the overall structure of a control device for a hybrid vehicle according to the first preferred embodiment of the present invention. In this figure, the thick solid lines indicate routes of transmission of mechanical power, while the thick broken lines indicate electrical power lines. Furthermore, the thin solid lines indicate control lines, while the double line indicates a hydraulic power transmission system.

This power train for a hybrid vehicle comprises an electric motor 1, an internal combustion engine 2, a clutch 3, another electric motor 4, a stepless transmission (a continuously variable transmission) 5, a deceleration device 6, a differential device (a differential gear) 7, and drive wheels 8. The clutch 3 is interposed between the engine 2 and the motor 4. The output shaft of the motor 1, the output shaft of the engine 2, and the input shaft of the clutch 3 are mutually linked together, and the output shaft of the clutch 3, the output shaft of the motor 4, and the input shaft of the stepless transmission 5 are mutually connected together.

When the clutch 3 is engaged, the engine 2 and the motor 4 both function as propulsion sources for the vehicle, while, when the clutch 3 is disengaged, only the motor 4 functions as a propulsion source for the vehicle. The driving force from one or the other, or both, of the engine 2 and the motor 4 are transmitted to the drive wheels 8 via the stepless transmission 5, the deceleration device 6, and the differential device 7. In the stepless transmission 5, hydraulic fluid is supplied from a hydraulic device 9 to clamp of belts of the stepless transmission 5. A hydraulic pump (not shown in the figure) of the hydraulic device 9 is driven by another electric motor 10.

The motors 1, 4 and 10 are AC electric motors such as, for example, three phase synchronous motors or three phase induction motors or the like. The motor 1 is principally used for engine starting and electrical power generation, while the motor 4 is principally used for propulsion and braking of the vehicle. Furthermore, the motor 10 is used for driving the hydraulic pump of the hydraulic device 9. Moreover, when the clutch 3 is engaged, the motor 1 can be used both for propulsion and for braking of the vehicle, while the motor 4 can be used for engine starting and for electrical power generation.

The clutch 3 is a powder clutch, and can adjust the torque which it transmits. It should be understood that, alternatively, a dry type uniplate clutch or a wet type multiplate clutch may be used for this clutch 3. The stepless transmission 5 is a belt type or toroidal type stepless transmission, and can adjust the gear ratio which it provides on an infinitely variable (stepless) basis.

The motors 1, 4 and 10 are respectively driven by inverters 11, 12 and 13. These inverters 11 through 13 are connected to the main battery 15 via a common DC link 14, and convert DC electrical power supplied from the main battery 15 into AC electrical power, which are supplied to the motors 1, 4 and 10 respectively. Furthermore, the inverters 11 and 12 can operate in reverse, so as to convert AC electrical power generated by the motors 1 and 4 respectively into DC electrical power which then charges the main battery 15. It should be understood that, since the inverters 11 through 13 are mutually connected together via the DC link 14, accordingly it is possible to supply electrical power which is generated by the motors during regenerative operation directly to the motors during powered drive operation, i.e. not via the main battery 15. For the main battery 15, any of various types of battery, such as a lithium ion battery, a nickel-hydrogen battery or a lead-acid battery or the like, or a power capacitor such as a so-called electric double layer capacitor may be used.

Figure 2:
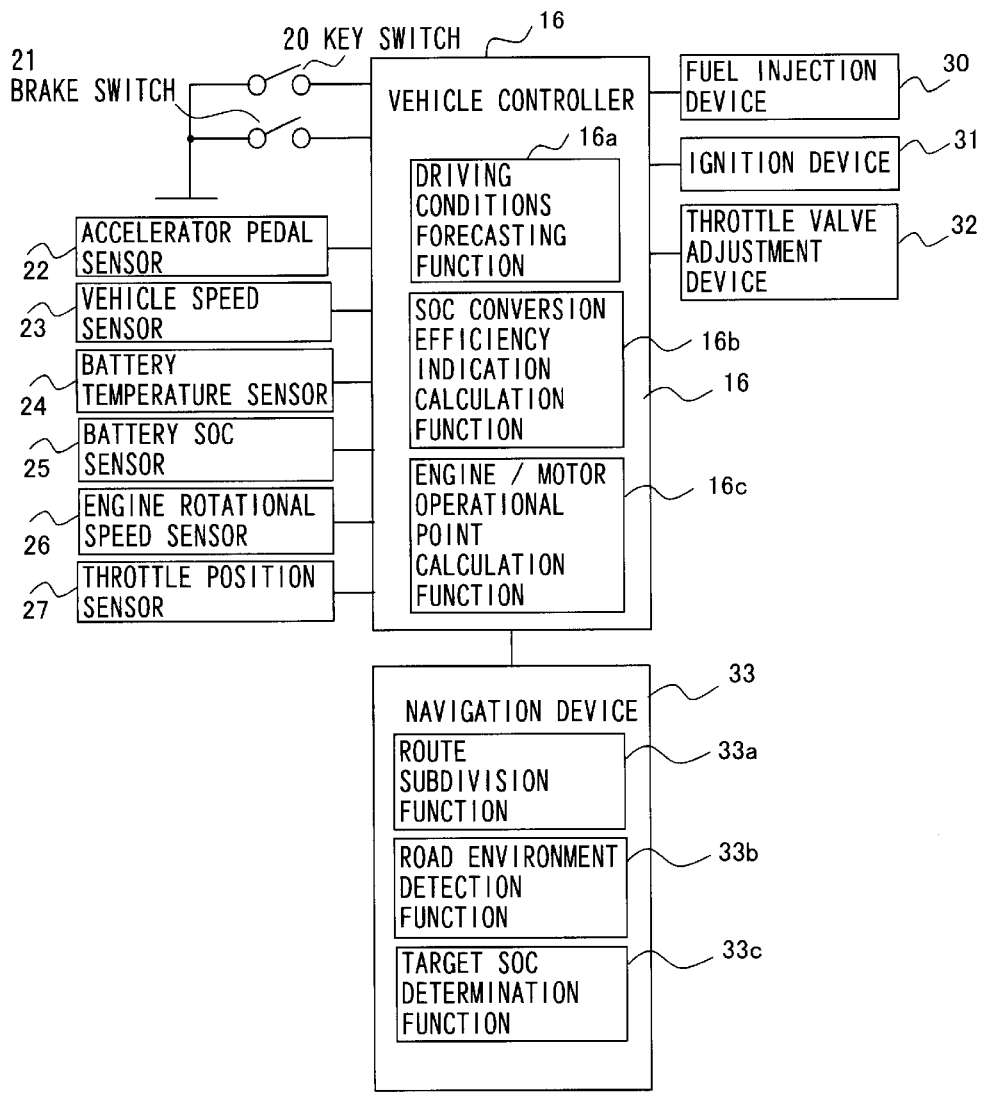
FIG. 2 is a figure showing the detailed structure of a vehicle controller and a navigation device.

Referring to FIG. 2, the vehicle controller 16 comprises a microcomputer and various peripheral devices such as memory, and controls the rotation speeds and output torques of the motors 1, 4 and 10, the rotation speed and output torque of the engine 2, the engagement and disengagement of the clutch 3, and gear ratio of the stepless transmission 5 and the like. To this vehicle controller 16, there are connected a key switch 20, a brake switch 21, an accelerator pedal sensor 22, a vehicle speed sensor 23, a battery temperature sensor 24, a battery SOC detection device 25, an engine rotational speed sensor 26, a throttle position sensor 27, and the like.

The key switch 20 is turned ON (closed circuit) when the key of the vehicle is inserted therein and is turned to an ON or to a START position. The brake switch 21 detects whether or not a brake pedal (not shown in the figures) of the vehicle is being stepped upon, while the accelerator pedal sensor 22 detects the amount by which an accelerator pedal (also not shown in the figures) of the vehicle is stepped upon (hereinafter this quantity is termed the "accelerator pedal opening amount"). The vehicle speed sensor 23 detects the road speed of the vehicle, while the battery temperature sensor 24 detects the temperature of the main battery 15. The battery SOC detection device 25 detects the state of charge of the main battery 15 (hereinafter, "state of charge" will be abbreviated as "SOC"), while the engine rotation speed sensor 26 detects the rotation speed of the engine 2. And the throttle position sensor 27 detects the opening amount of a throttle valve of the engine 2.

To the vehicle controller 16 there are further connected a fuel injection device 30, an ignition device 31, a throttle valve adjustment device 32, and a navigation device 33 and so on of the engine 2. And the controller 16 controls the fuel injection device 30 so as to adjust the amount of fuel injected into the engine 2 or so as to stop the supply of fuel to the engine 2, controls the ignition device 31 so as to perform ignition for the engine 2, and controls the throttle valve adjustment device 32 so as to adjust the output torque of the engine 2.

The navigation device 33 comprises a satellite navigation device which detects the present position of the vehicle and the direction in which it is travelling by using a GPS receiver, an autonomous navigation device which detects the current orientation of the vehicle and the direction in which it is travelling by using a gyrocompass or the like, a road-to-vehicle communication device such as VICS or the like which receives traffic information and road information, and a road map database and the like, and searches for the most suitable route to the target location, and guides the persons in the vehicle along the most suitable route.

The navigation device 33 further comprises a route subdivision function 33a, a road environment detection function 33b, and a target SOC determination function 33c, all of which are implemented by microcomputer software. The route subdivision function 33a is a function for subdividing the suggested route to the target location. The road environment detection function 33b is a function for detecting ground information such as road segment radius of curvature, road gradient, presence or absence of intersections, tunnels, railroad crossings and the like, regulatory information such as speed limit and the like, whether the road is a city road or a mountain road, and the like. And the target SOC determination function 33c is a function for determining a target SOC (t_SOC) for the main battery 15 up to the target location.

The vehicle controller 16 comprises a driving conditions forecasting function 16a, a SOC conversion efficiency indication calculation function 16b, and an engine/motor operational point calculation function 16c, all of which are implemented by microcomputer software. The driving conditions forecasting function 16a is a function for forecasting the vehicle speed and a drive/brake power command value in each subdivided route section, based upon the road environment in that subdivided route section. The SOC conversion efficiency indication calculation function 16b is a function which calculates a SOC conversion efficiency indication SOCc which is used when determining the engine/motor operational point. The engine/motor operational point calculation function 16c is a function which calculates the operational point for the engine 2 and the motors 1 and 4, based upon the SOC conversion efficiency indication SOCc mentioned above, and upon the vehicle speed and the drive/brake power command value.

—The Method for Calculating the SOC Conversion Efficiency Indication SOCc—

As described above, with a control device for a hybrid vehicle according to the prior art, if the battery SOC during vehicle operation becomes lower than the target value, then the operational point of the engine and the motor is switched over to the charge side, while, if the battery SOC during vehicle operation becomes higher than the target value, then the operational point of the engine and the motor is switched over to the charge stop side or the discharge side. Accordingly, since no consideration is accorded to the influence which the road environment and the driving conditions of the route along which the vehicle is being guided exert upon the efficiencies of the engine and the motor, the fuel consumption is not kept down to its minimum limit in terms of the route along which the vehicle is being guided.

Accordingly, with the control device for a hybrid vehicle according to this first preferred embodiment of the present invention, the engine 2 and the motors 1 and 4 are controlled so that the SOC of the main battery 15 attains its target value while keeping the fuel consumption down to its minimum limit in terms of the route along which the vehicle is being guided.

First, the target SOC (t_SOC) for the target location is set. This target SOC (t_SOC) is a target value for SOC at the target location. Accordingly, while enroute for the target location, it is not absolutely necessary for the SOC for the main battery 15 to agree with this target SOC (t_SOC), and the operational point of the engine 2 and the motors 1 and 4 is not set based upon this target SOC (t_SOC) while enroute. There are various methods for setting this target SOC (t_SOC), such as a method of setting it to a constant value—for example, 70%—without any dependence upon the road environment, or a method of setting it according to the altitude of the target location—for example, a method of setting the target SOC (t_SOC) smaller, the higher is the target location, in the expectation that it will be possible to recoup running energy into the main battery 15 when descending.

Next, with this first preferred embodiment of the present invention, a SOC conversion efficiency indication SOCc is obtained by calculation by determining the operational point for the engine 2 and the motors 1 and 4 on the way to the target location, under the assumption that the SOC for the main battery 15 at the target location is to be made equal to the target SOC (t_SOC) while keeping the fuel consumption down to its minimum value while enroute to the target location.

When this SOC conversion efficiency indication SOCc is large, the engine/motor operational point is set so as to perform charging only when the amount of increase of charge electrical power $\Delta$bat per unit fuel increase amount $\Delta$fuel for charging the battery becomes large, in other words when the efficiency with which the fuel is utilized while charging the battery becomes high. On the other hand, when this SOC conversion efficiency indication SOCc is small, the engine/motor operational point is determined so as to perform charging, even if the efficiency with which the fuel is utilized while charging the battery is low.

The method for calculation of the SOC conversion efficiency indication SOCc will now be explained with reference to FIGS. 3A–3D.

Figure 3A:
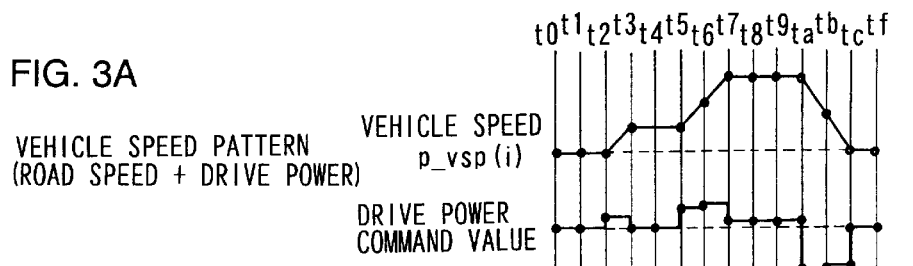
FIGS. 3A–3D are figures for explanation of a method for calculating a SOC conversion efficiency indication.
Figure 3B:
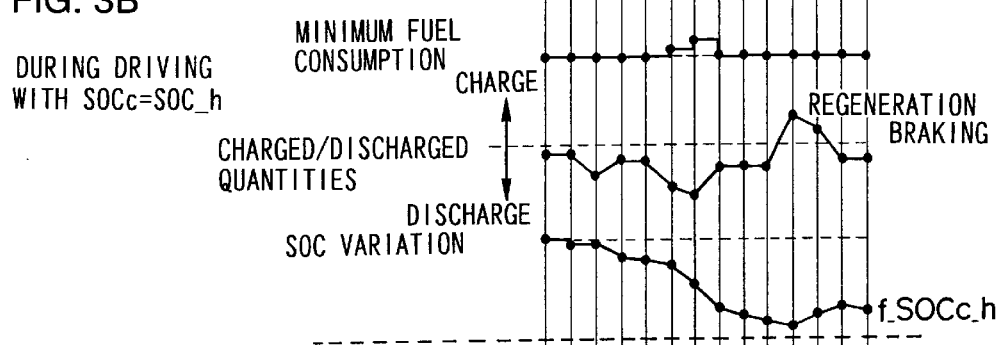
Figure 3C:
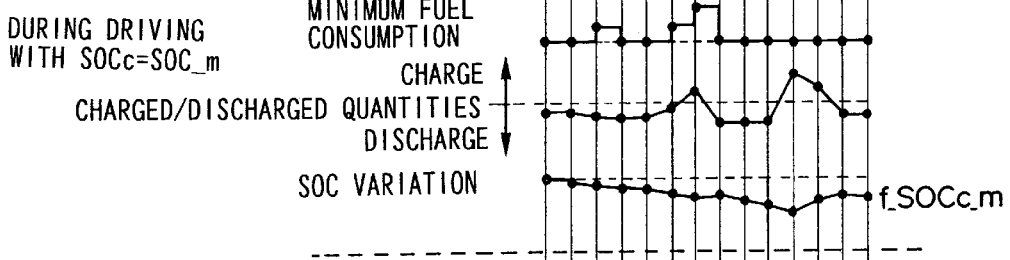
Figure 3D:
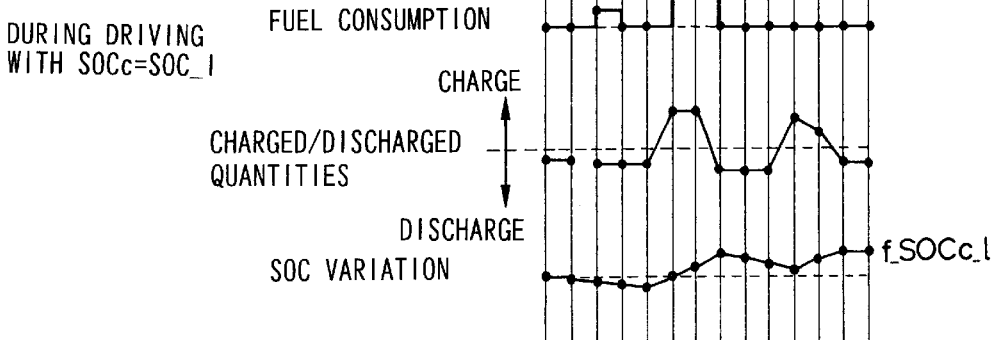

By way of example, the case will be explained in which the pattern for driving from the current location to the target location is as shown in FIG. 3A. Referring to this figure, the route to the target location is divided into n sections, designated as way(i), where i=1, 2, . . . n. And, for each way(i), the vehicle speed p_vsp(i) and the drive/brake power command value p-tTd(i) are forecast, based upon the road environment for that section. The method by which this forecasting of the vehicle speed p_vsp(i) and the drive/brake power command value p-tTd(i) is performed will be described hereinafter. And FIGS. 3B through 3D are figures showing, respectively, the changes over the entire trip of the minimum fuel consumption, the charge/discharge quantities, and the SOC, if the operational point of the engine 2 and the motors 1 and 4 is determined by setting the SOC conversion efficiency indication SOCc to three types of fixed values SOCc_h, SOCc_m, and SOCc-l, where SOCc_h>SOCc_m>SOCc-l.

As described above, the SOC conversion efficiency indication SOCc is an indication which shows the efficiency of utilization of fuel when charging the battery. When the SOC conversion efficiency indication SOCc is set to SOCc_h, SOCc_m, and SOCc_l respectively, if the final SOCs at the target location are termed f_SOCc_h, f_SOCc_m, and f_SOCc_l respectively, then, as will be clear from FIGS. 3B through 3D, f_SOCc_h is the least, while f_SOCc_l is the greatest. In other words, when the engine/motor operational point is set so that charging is performed only when the efficiency of fuel utilization is high, then the actual SOC at the target location becomes low.

Any arbitrary value is set for the SOC conversion efficiency indication SOCc as an initial value, and provisional operational point for the engine 2 and the motors 1 and 4 is determined upon by an engine/motor operational point determination method which will be described hereinafter, based upon the forecast vehicle speeds p_vsp(i) and forecast drive/brake power command values p-tTd(i) for each subdivided route section way(i). And forecast values p_bat(i) are obtained for the amount of charged/discharged battery electrical power for each subdivided section way(i), and by integrating these forecast amounts of charged/discharged battery electrical power p_bat(i) for each subdivided section way(i) over time, while taking the present SOC(d_SOC) as an initial value, it is possible to obtain a forecast SOC(p_SOC(i)) for each subdivided route section way(i), and a forecast SOC(p_SOC(n)) for the target location.

The forecast SOC(p_SOC(n)) for the target location is calculated by setting the initial value SOCc_0 to the SOC conversion efficiency indication SOCc. If the forecast SOC (p_SOC(n)) at the target location is greater than the target SOC(t_SOC) at the target location, then it is necessary to reduce the value of the forecast SOC(p_SOC(n)) at the target location. Since as explained above the forecast SOC (p_SOC(n)) at the target location becomes small if the SOC conversion efficiency indication SOCc is large, accordingly the SOC conversion efficiency indication SOCc should be set large, in order to reduce the forecast SOC(p_SOC(n)). In other words, the SOC conversion efficiency indication SOCc is calculated anew according to the following Equation (1):

$$SOCc = SOCc + \alpha (\alpha > 0) \qquad (1)$$

Conversely, if the forecast SOC(p_SOC(n)) at the target location is less than the target SOC(t_SOC) at the target location, then the SOC conversion efficiency indication SOCc is calculated according to the following Equation (2):

$$SOCc = SOCc - \alpha (\alpha > 0) \quad (2)$$

The above calculation is repeated until the forecast SOC (p_SOC(n)) at the target location almost agrees with the target SOC(t_SOC) at the target location, in other words until the difference between them becomes less than a predetermined value. When the result of this calculation is that the two above quantities almost agree with one another, the value SOCc_j (where j is an integer greater than 0) is determined as the final SOC conversion efficiency indication SOCc. The calculation for determining this final SOC conversion efficiency indication SOCc is performed every time that the target location is input anew or is changed, or when the actual track of the vehicle deviates from the route along which it is being guided by the navigation device, or when the traffic congestion situation changes. By doing this, it is possible to determine the SOC conversion efficiency indication SOCc according to the new target location, the new current vehicle location, or the change of congestion situation.

In these Equations, $\alpha$ is a constant value which is set appropriately in order for the calculation not to diverge when it is repeated. Furthermore, the initial value SOCc_0 which is utilized for the calculation could also be determined according to traffic information or the like. For example, if the traffic congestion is serious or the present value of SOC(d_SOC) is small, it would be appropriate to set SOCc_0 to a smaller value. Furthermore, if this route is one over which the vehicle has travelled before, it may be appropriate to set an initial value which is corrected by being reduced according to the amount by which the present value of SOC(d_SOC) is lower than the SOCc at that previous time.

—The Method for Determining the Operational Point of the Engine and the Motors—

Next the method by which the operational point for the engine and the motors is determined when the clutch 3 is engaged will be explained with reference to FIGS. 4 and 5. It is to be noted that the operational points A, N, B, C, D and E in FIG. 4 correspond respectively to the same operational points A, N, B, C, D and E in FIG. 5.

When performing the calculation for determining the SOC conversion efficiency indication, a provisional operational point for the engine 2 and the motors 1 and 4 is determined based upon the SOCc during provisional setting, and upon the forecast vehicle speeds p_vsp(i) and the forecast drive/brake power command values p_tTd(i) for each subdivided route section way(i). On the other hand, when the determination of the SOC conversion efficiency indication SOCc has been completed, and the vehicle is actually proceeding towards the target location, a proper operational point for the engine 2 and the motors 1 and 4 is determined based upon the SOC conversion efficiency indication SOCc which has been determined (=SOCc_j), the detected vehicle speed value d_vsp, and the calculated value d_tTd of the drive/brake power command value. It is to be noted that this calculated value d_tTd of the drive/brake power command value is obtained by calculation, based upon the detected vehicle speed value d_vsp and the detected accelerator pedal opening amount value, by table lookup from a drive/brake power command value table which is set in advance.

When determining any one of the operational points, the operational point is set so as to perform charging only when the fuel utilization efficiency during battery charging becomes the higher, the greater is the SOC conversion efficiency indication SOCc_j or SOCc.

Figure 4:
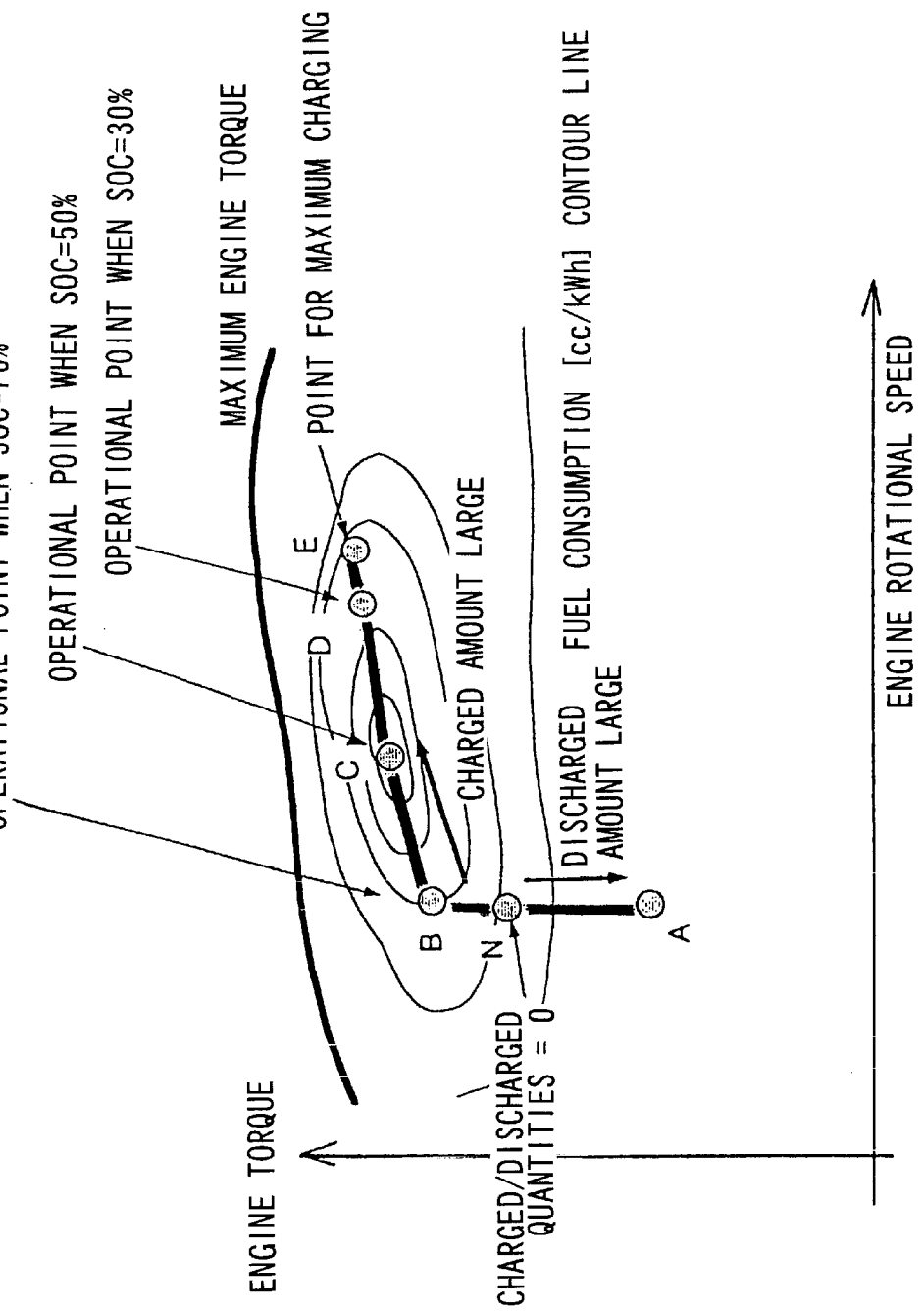
FIG. 4 is a figure showing certain operational points for an engine and motors of FIG. 1.

FIG. 4 shows, by way of example, engine/motor operational points when the vehicle speed is 50 km/h and the drive/brake power command value is 1000N. FIG. 5 shows the relationship between the engine/motor operational points and the battery charge amount for the same vehicle speed of 50 km/h and the same drive/brake power command value of 1000N.

Referring to FIG. 4, the thick line is a most suitable fuel consumption line which joins the operational points at which the fuel consumption becomes minimum when the same engine output is obtained. This most suitable fuel consumption line takes into consideration the efficiencies of the engine 2, of the motors 1 and 4, and of the stepless transmission 5. The engine/motor operational point must be determined as being upon this most suitable fuel consumption line. The point A is the operational point when the vehicle is driven as much as possible by using the motors 1 and 4 (for example, the vehicle is driven by supplying the maximum amount of electrical power taken out from the main battery 15 to the motors 1 and 4), and the deficiency is covered by the output of the engine 2. On the other hand, the point E is the operational point when, along with driving the vehicle by the engine 2, the motors 1 and 4 are operated as electrical generators in order to provide as much charge amount as possible for the battery 15.

Taking the operational point A at which the main battery 15 is discharging as a standard, as the amount of fuel supplied to the engine 2 is increased, at the point N the amount of electrical power discharged from the main battery 15 becomes zero, and the amount by which the main battery 15 is charged then progressively increases in order through the points B-C-D-E. The charge amounts at these points are shown in FIG. 5. In other words, the charge amount at the point B is c_b (kW); the charge amount at the point C is c_c (kW); the charge amount at the point D is c_d (kW); and the charge amount at the point E is c_e (kW).

Figure 5:
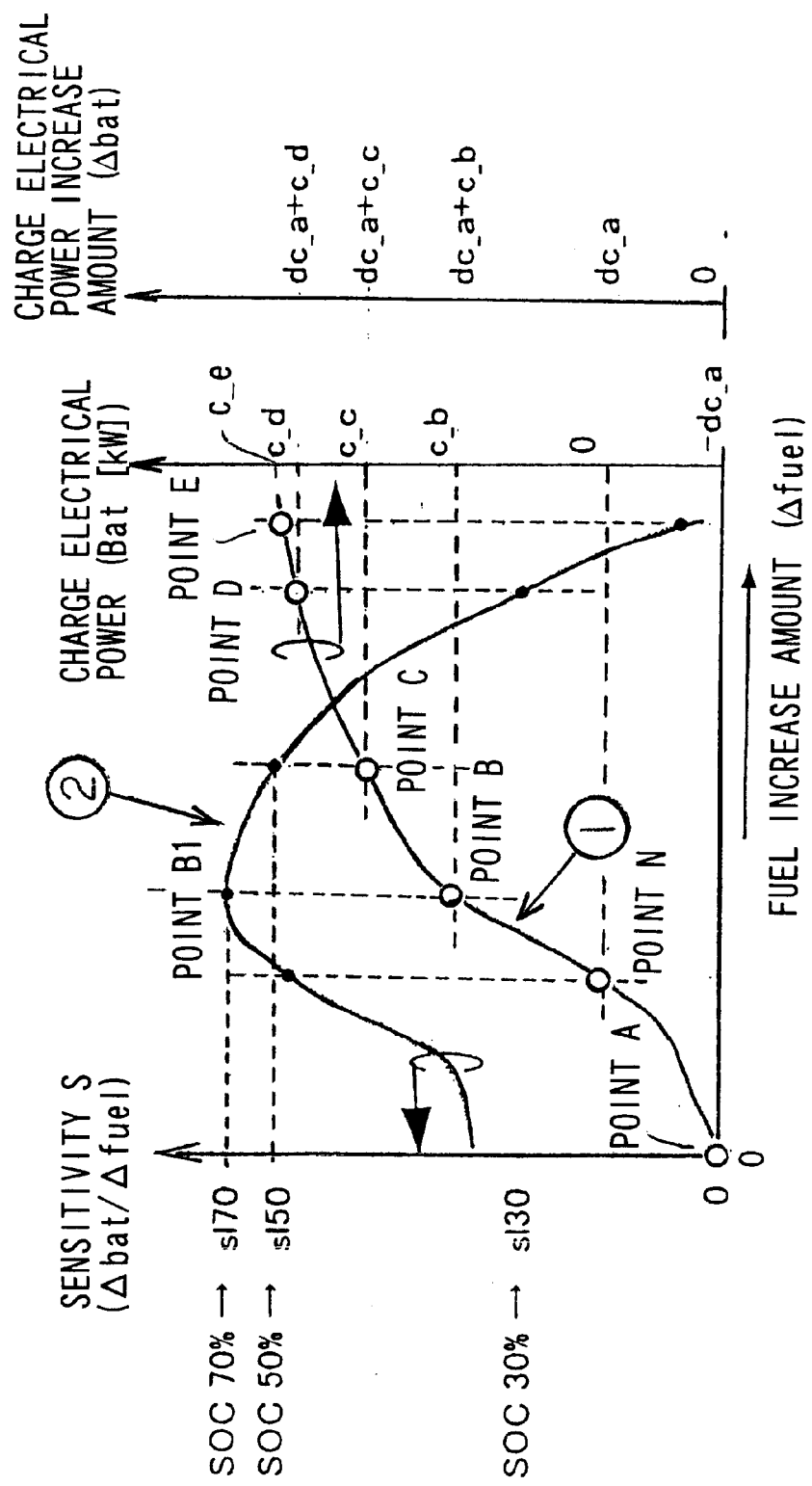
FIG. 5 is a graph showing the behavior of a charge electrical power increase amount Δbat, a charge electrical power Bat, and a sensitivity S with respect to an engine fuel increase amount Δfuel.

Taking the fuel supply amount at the point A as a standard, the relationship between the amount of increase of charge electrical power Δbat and the charge electrical power Bat with respect to the fuel increase amount Δfuel is shown by the curve ① in FIG. 5. And the curve ② shows the ratio of the amount of increase of charge electrical power Δbat with respect to the fuel increase amount Δfuel (=Δbat/Δfuel) as obtained from the curve ①, and this ratio is termed the sensitivity S. These curves ① and ② are obtained and stored by experiment in advance or the like for various combinations of vehicle speed and drive/brake power.

As shown in FIG. 5, greater values of the SOC conversion efficiency indication SOCc correspond to greater values of the sensitivity S. In the shown example, the sensitivity S corresponding to a SOC conversion efficiency indication SOCc of 70% is s170; the sensitivity S corresponding to a SOC conversion efficiency indication SOCc of 50% is s150; and the sensitivity S corresponding to a SOC conversion efficiency indication SOCc of 30% is s130.

The engine/motor operational point is determined so as to obtain a charge electrical power for a sensitivity S which corresponds to the SOC conversion efficiency indication SOCc. For example, if the SOC conversion efficiency indication SOCc is 70%, then the point B1 is obtained upon the sensitivity line ② which satisfies the condition that the sensitivity S=s170, and the point B upon the curve ① which corresponds to this point B1 is obtained. The point B in FIG. 4 which corresponds to this point B in FIG. 5 is taken as the operational point for the engine 2 and the motors 1 and 4. It is to be noted that, if there are two points upon the curve ② which satisfy the condition for the sensitivity S, then the one is taken for which the charge electrical power Bat is the greater. Furthermore, if there is no point upon the curve ② which satisfies the condition for the sensitivity S, in other words if no operational point exists at which it is possible to perform charging at the sensitivity S under the presently existing vehicle speed and drive/brake power conditions, then the point A in FIG. 4 is taken as the operational point for the engine 2 and the motors 1 and 4.

Since the curves ① and ② changes with regard to the conditions of vehicle speed and drive/brake power, the maximum value for the sensitivity S also differs for different conditions of vehicle speed and drive/brake power. Accordingly, if the SOC conversion efficiency indication SOCc is high, it is only possible to obtain an operational point which satisfies the condition for the value of the sensitivity S under relatively limited conditions of vehicle speed and drive/brake power. Conversely, if the SOC conversion efficiency indication SOCc is low, it is possible to obtain an operational point which satisfies the condition for the value of the sensitivity S under a relatively wide range of conditions of vehicle speed and drive/brake power.

Due to this, the higher is the SOC conversion efficiency indication SOCc, the smaller does the opportunity for performing charging of the battery become; and, conversely, the lower is the SOC conversion efficiency indication SOCc, the greater does the opportunity for performing charging of the battery become. Furthermore, the greater is the SOC conversion efficiency indication SOCc, the higher does the efficiency of fuel utilization when performing charging of the battery become; while, conversely, the lower is the SOC conversion efficiency indication SOCc, the lower does the efficiency of fuel utilization when performing charging of the battery become.

It is to be noted that, in the above explanation, by way of example, the description assumed that, after obtaining the sensitivity S which corresponded to the SOC conversion efficiency indication SOCc, the charge electrical power Bat which realized this sensitivity S was obtained, and then the engine/motor operational point corresponding to this charge electrical power Bat was obtained. As a different method, it would also be possible to store data which established the relationship of the charge electrical power Bat and the engine/motor operational point with respect to the SOC conversion efficiency indication SOCc, and to obtain the charge electrical power Bat and the engine/motor operational point by reading out this data. By doing this, it would be possible to calculate the engine/motor operational point very easily.

Furthermore, with regard to the characteristics of the curve ① in FIG. 5, it would be possible to establish a relationship between the discharge efficiency of the main battery 15 during discharge to the left of the point N, and the charge efficiency of the main battery 15 during charge to the right of the point N, in consideration of the electrical power consumption of various electrical components which are mounted to the vehicle.

The gear ratio of the stepless transmission 5 is adjusted to a gear ratio which implements the vehicle speed and the rotation speed at the engine/motor operational point. The output torques of the motors 1 and 4 are allocated by advance setting, and are calculated at values at which the target drive/brake power command value can be implemented by the motors 1 and 4 and the engine 2.

Figure 6:
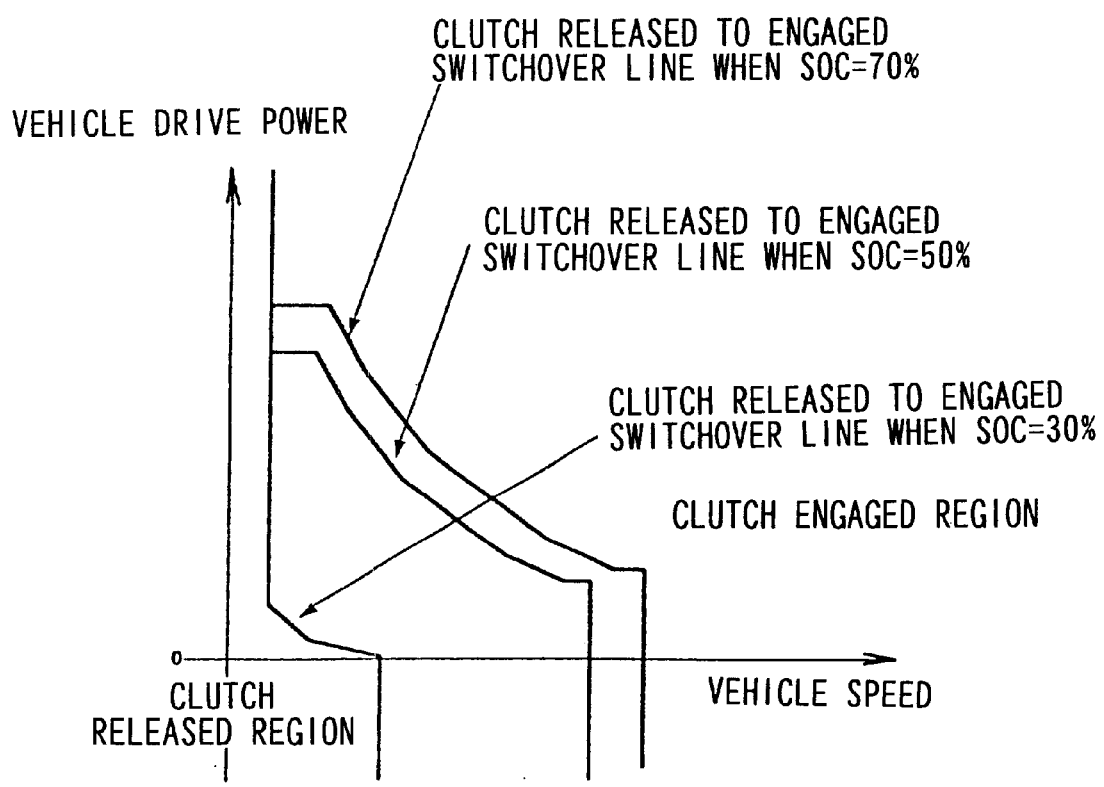
FIG. 6 is a map showing certain set operational points for a clutch.

As for the operational point of the clutch 3, a relationship is established in advance as shown in FIG. 6, and engagement and disengagement of the clutch 3 is controlled according to this relationship. When the clutch 3 is disengaged the rotation speeds of the engine 2 and the motor 1 are the same, and in the steady state, under the condition that the torque of the engine 2 and the conversion value around the engine shaft of the torque of the motor 1 are equal to one another, the operational point of the engine 2 and the motors 1 and 4 are determined by the method which has been explained above with reference to FIGS. 4 and 5.

Since in this first preferred embodiment of the present invention, the above described method for determination of the operational point of the engine and the motors is employed in the calculation of the SOC conversion efficiency indication SOCc, and, conversely, the above described SOC conversion efficiency indication SOCc is used in the determination of the operational point of the engine and the motors, accordingly if neither of them is determined in advance, it becomes impossible to perform either of these calculations. Thus, as described above, in the calculation of the SOC conversion efficiency indication SOCc, first the value of SOCc is set to any value—in the above example, it is set to the initial value of SOCc_0—and the provisional operational point of the engine and the motor is obtained, and then the value at the target location SOC (p_SOC(n)) is forecast. And the calculation of the SOC conversion efficiency indication SOCc is repeated, using the predetermined value α, according to the above Equations (1) and (2), until the forecast SOC(p_SOC(n)) at the target location agrees with the target SOC(t_SOC), and the value of SOCc_j when the calculation has converged is set as the final SOC conversion efficiency indication SOCc.

Thereafter, the actual operation point of the engine and the motors is determined based upon this SOC conversion efficiency indication SOCc which has been thus determined. First, the drive/brake power command value d_tTd which corresponds to the detected vehicle speed d_vsp and the detected accelerator pedal opening amount d_acc is calculated by lookup from a table of drive/brake power command values based upon the vehicle speed and the accelerator pedal opening amount which is set in advance. Next, the proper operational point for the engine and the motors is determined based upon the SOC conversion efficiency indication SOCc, the detected vehicle speed d_vsp, and the calculated value d_tTd of the drive/brake power command value. And the engine 2 and the motors 1 and 4 are controlled according to this operational point which has thus been determined.

By setting the operational point of the engine 2 and the motors 1 and 4 by using the SOC conversion efficiency indication SOCc for the guide route to the target location in this manner, it is possible to bring the SOC of the main battery 15 at the target location to its target value t_SOC while keeping the fuel consumption along the guide route to the target location to its minimum limit value.

Figure 7:
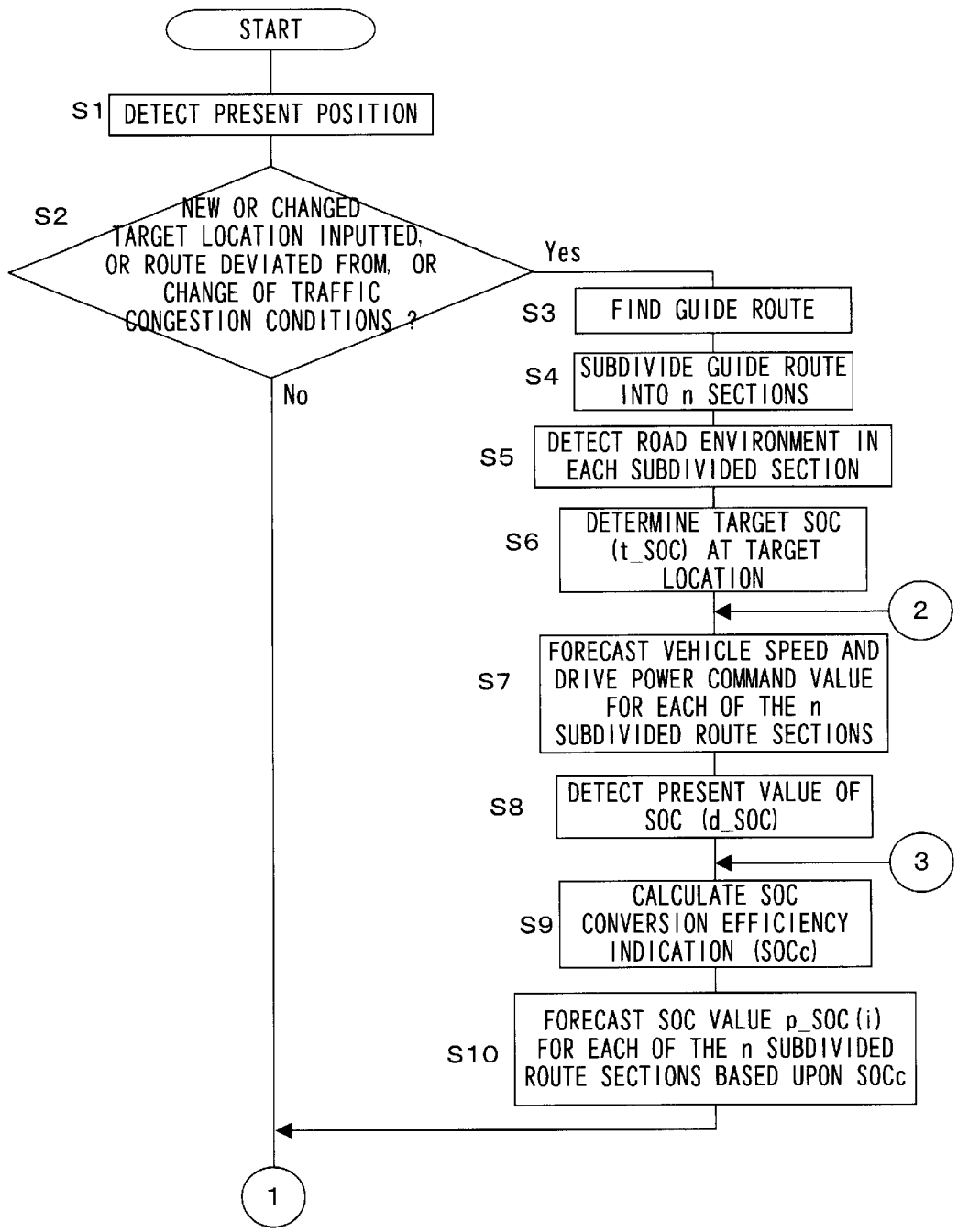
FIG. 7 is a flow chart showing the control flow of a vehicle control program of the first preferred embodiment of the present invention.
Figure 8:
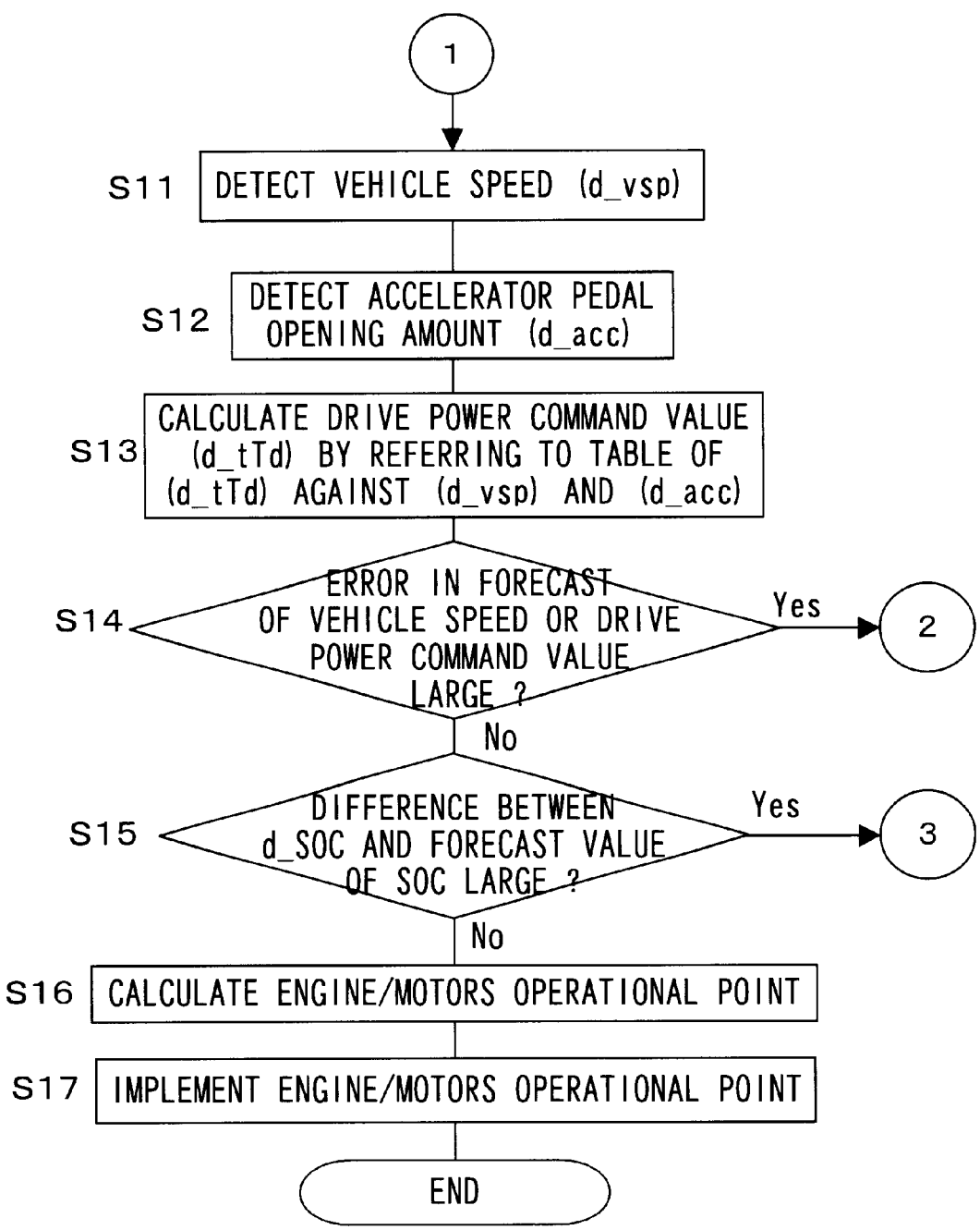
FIG. 8 is a flowchart continuing on from FIG. 7, showing the further control flow of this vehicle control program of the first preferred embodiment.

FIGS. 7 and 8 are flow charts showing the flow of a vehicle control program. The operation of the control device for a hybrid vehicle according to this first preferred embodiment of the present invention will now be described with reference to these flow charts. The vehicle controller 16 executes this control program repeatedly at predetermined intervals. First, in a step S1 in FIG. 7, the present vehicle position is detected. It is to be noted that, in the second and subsequent iterations of this program, it is detected at which position of the subdivided route sections way(i) (i=1~n) the currently is vehicle. Next in a step S2, it is judged as to whether or not a new input or change of target location, or a deviation from the guide route, or a change in traffic congestion conditions has taken place. If any of a new input or change of target location, or a deviation from the guide route, or a change in traffic congestion conditions has taken place, then the flow of control proceeds to a next step S3, while if none of these occurrences has taken place then the flow of control is transferred to a step S11 (refer to FIG. 8). It is to be noted that information about any change in traffic congestion conditions is received from the road-to-vehicle communication device such as VICS or the like, as previously described.

In the step S3, a guide route to the target location is found, and then the flow of control proceeds to a next step S4. In this step S4, the guide route to the target location is subdivided into n sections way(i), where i=1~n. There are various possibilities for this route subdivision method, such as a method of subdividing at division points corresponding to points on the ground which are characterized by particular features of the road environment, such as points where the road gradient changes, intersection points, points where the type of road changes, points where traffic congestion starts or ends, toll booths for expressways, and the like, or a method of subdividing the route to the target location into n equal portions, etc. . . . It is to be noted that it would also be acceptable, if the distance to the target location is great, to take an intermediate point upon the guide route as a provisional target location for performing the route subdivision. Furthermore, there are various possibilities for the method for determining the number of route subdivisions to be established, such as a method of determining this number according to the number of changes of slope, the number of intersections, and the number of types of road, or a method of determining the number of divisions proportionally to the distance to the target location, etc. . . . When the guide route has been subdivided into n sections, the flow of control proceeds to a next step S5.

In a step S5, various features of the road environment in each subdivided section way(i) are detected, such as the average slope, the positions of intersection points, the radius of curvature, the altitude and the like. Next in a step S6, a target SOC (t_SOC) at the target location is determined, based upon the road environment in each subdivided section way(i), as described above. When the target SOC (t_SOC) has been determined upon, the flow of control proceeds to a step S7.

In this step S7, the vehicle speed p_vsp(i) and the drive/brake power command value p_tTd(i) for each subdivided section way(i) between the present position and the target location are forecast based upon the road environment for each subdivided section way(i) detected in the step S5. The forecast of the vehicle speed p_vsp(i) may be made, for example, in the following manner. The legal speed limit upon the guide route is taken as the forecast value. At intersections where the vehicle will be required to turn right or left, it is assumed that the vehicle speed will diminish to zero at, for example, a deceleration of 0.1 G, and after three seconds stationary will return back up to the cruise speed at an acceleration of 0.1 G, and an overall vehicle speed p_vsp(i) is forecast based upon this assumption. Furthermore, in sections where the road is curved, a vehicle speed p_vsp(i) is forecast based upon the acceleration and deceleration corresponding to the curvature of the road and the passing speed. Moreover, if road congestion information has been received from a road-to-vehicle communication device such as VICS or the like, a vehicle speed p_vsp(i) is forecast for which the average vehicle speed is the lower, the worse is the congestion over the congested section.

As the drive/brake power command value p_tTd(i) for each subdivided section way(i), the value set is the sum of a drive/brake power amount for overcoming the drive resistance (air resistance amount+rolling resistance amount) corresponding to the vehicle speed p_vsp(i), a drive/brake power amount for acceleration and deceleration corresponding to the speed difference from the previous section, and a drive/brake power amount for acceleration and deceleration corresponding to the road slope for absorbing the change of potential energy of the vehicle. When the vehicle speed p_vsp(i) and the drive/brake power command value p_tTd (i) for each subdivided section way(i) have been forecast, the flow of control proceeds to a next step S8.

In this step S8, the present value of SOC (d_SOC) is detected, and then the flow of control proceeds to a next step S9. In this step S9, the SOC conversion efficiency indication SOCc is calculated by the method described above. Next in a step S10, the value of SOC (p_SOC(i)) for each subdivided section way(i) is forecast, based upon the SOC conversion efficiency indication SOCc which was calculated in the step S9, the forecast vehicle speed p_vsp(i) and the forecast drive/brake power command value p_tTd(i) which was obtained in the step S7.

First, a provisional operational point for the engine 2 and the motors 1 and 4 for each subdivided section way(i) is obtained as described above, based upon the SOC conversion efficiency indication SOCc, the forecast vehicle speed p_vsp(i) and the forecast drive/brake power command value p_tTd(i), and a forecast battery charge/discharge electrical power p_bat(i) is obtained for each subdivided section way(i) Accordingly, it is possible to forecast the SOC (p_SOC(i)) for each subdivided section way(i) by integrating this forecast battery charge/discharge electrical power p_bat(i) for each subdivided section way(i) over time, taking the present SOC (d_SOC) as an initial value. When the SOC (p_SOC(i)) for each subdivided section way(i) has been forecast, the flow of control proceeds to a next step S11.

In the step S11 (refer to FIG. 8), the vehicle speed d_vsp is detected by the vehicle speed sensor 23, and then the flow of control proceeds to the next step S12. In this step S12, the accelerator pedal opening amount d_acc is detected by the accelerator pedal sensor 22. Next in a step S13, the drive/brake power command value d_tTd corresponding to the detected values of the vehicle speed d_vsp and of the accelerator pedal opening amount d_acc is calculated by table lookup from a drive/brake power command value table based upon the vehicle speed and the accelerator pedal opening amount which is set in advance. When this drive/brake power command value d_tTd has been thus obtained, the flow of control proceeds to a next step S14.

In this step S14, it is judged as to whether or not, at the end point of each subdivided section way(i), either of, for example, the deviation between the average vehicle speed d_vsp(i) and the forecast vehicle speed p_vsp(i), and the deviation between the average drive/brake power command value d_tTd(i) and the forecast drive/brake power command value p_tTd(i), is greater than a respective predetermined value therefor, for each subdivided section. If either the deviation of the average vehicle speed d_vsp(i) or the deviation of the average drive/brake power command value d_tTd(i) is greater than its respective predetermined value, then the flow of control returns to the step S7, while if, on the other hand, both of these deviations are less than the predetermined values therefor, then the flow of control proceeds to a next step S15.

Moreover, as an indication of the total deviation, there is for example one possible method, in which a total ERR_1 is obtained which is the weighted sum of the squares of the errors in the vehicle speed and the squares of the errors in the drive/brake power command values, according to the following Equation (3):

$$\mathrm{ERR\_1} = \Sigma\{(\mathrm{d\_vsp}(i) - \mathrm{p\_vsp}(i))^2 + K1(\mathrm{d\_tTd}(i) - \mathrm{p\_tTd}(i))^2\} \quad (3)$$

In Equation (3), K1 is a constant, while "Σ" denotes the total sum from the last time point at which the forecast value was updated to the present time point.

Furthermore, since the power which acts upon the vehicle has a strong correlation with the fuel consumption (which is an important consideration in this first preferred embodiment) and the charge/discharge of electrical power, accordingly, as an indication of the total deviation, there is another possible method in which a total ERR_2 is obtained which is the sum of the squares of the deviations of a value which corresponds to the power, i.e. (vehicle speed×drive/brake power), according to the following Equation (4):

$$\mathrm{ERR\_2} = \Sigma\{(\mathrm{d\_vsp}(i) \cdot \mathrm{d\_tTd}(i) - \mathrm{p\_vsp}(i) \cdot \mathrm{p\_tTd}(i))^2\} \quad (4)$$

In Equation (4), "Σ" denotes the total sum from the last time point at which the forecast value was updated to the present time point.

It is to be noted that, when jumping from the step S14 to the step S7 in the case that it has been determined that either the deviation of the average vehicle speed d_vsp(i) or the deviation of the average drive/brake power command value d_tTd(i) is greater than its respective predetermined value, then the directions of the deviations of the actual values of these quantities from their forecast values are detected, and the vehicle speed p_vsp(i) and the drive/brake power command value p_tTd(i) are forecast again in the step S7 in consideration of the directions of deviation. For example, when there is a tendency during vehicle operation for the actual vehicle speed to be lower than the forecast vehicle speed p_vsp(i), then the forecast vehicle speed p_vsp(i) is set to a lower value; and, when there is a tendency during vehicle operation for the actual drive/brake power command value to be higher than the forecast drive/brake power command value p_tTd(i), then the forecast drive/brake power command value p_tTd(i) is set to a higher value. Or it would also be acceptable, if the guide route is one which has previously been travelled over, to take the vehicle speed pattern m_vsp(i) for the route section when it was previously travelled over as the forecast vehicle speed p_vsp(i); or, alternatively, a value might be taken which is between the forecast vehicle speed p_vsp(i) and the previous vehicle speed m_vsp(i). However, in this case, it is necessary to store at least the vehicle speeds m_vsp(i) for route sections over which the vehicle has travelled in the past.

In the step S15, at the end point of each subdivided section way(i), it is judged as to whether or not the deviation between the current value of SOC (d_SOC) and the forecast SOC (p_SOC(i)) is greater than a predetermined value. By this judgement, it is detected whether or not there is an excess or a deficiency of SOC in each subdivided section caused by SOC forecasting error, or caused by use of vehicle systems and electrical equipment such as electrically operated power steering or an air conditioning device or the like which utilize electrical energy from the same battery 15. If in this step it is judged that the deviation is greater than the predetermined value therefor, then the flow of control returns to the step S9, while if it is judged that the deviation does not exceed the predetermined value, then the flow of control proceeds to a next step S16. It is to be noted that it would also be possible to use, as an indication of deviation, for example, the quantity ERR_3 defined by the following Equation (5):

$$\mathrm{ERR\_3} = (\mathrm{d\_SOC} - \mathrm{p\_SOC}(i))^2 \quad (5)$$

In the next step S16, a proper operational point when operating the engine 2 and the motors 1 and 4 is calculated based upon the value SOCc_j to which the SOC conversion efficiency indication SOCc has converged, the present detected value d_vsp of vehicle speed, and the calculated value d_tTd for the drive/brake power command value. If at this time the detected value of SOC (d_SOC) is in the vicinity of the upper or the lower limit value which is set in advance for protection of the main battery 15, then, the calculation is performed using the detected value of SOC (d_SOC) instead of the SOC conversion efficiency indication SOCc, in order to accord priority to protection of the vehicle battery 15. Next in the step S17, the torque of the engine 2, the torques of the motors 1 and 4, the gear ratio of the stepless transmission 5, and the engagement and disengagement of the clutch 3 are controlled so as to implement the engine/motor operational point determined upon above.

It is to be noted that, if the navigation device 33 is not operating so that no target location can be set, then only the steps S8, S11, S12, S13, S16, and S17 of FIGS. 7 and 8 are executed, in the specified order. However, if no target location is set although the navigation device 33 is operating, then one expedient which may be employed is to detect the fact that the vehicle is travelling along a route which it has travelled along in the past, or along a route which it travels on an everyday basis, and to conjecture the target location, such as for example the destination to which the vehicle previously travelled or a supermarket or the like, from the information which was obtained when travelling this route in the past, and then to execute the procedures of the step S3 and the following.

Moreover, since the forecast values of SOC (p_SOC(i)) for all the subdivided sections way(i) are calculated in order to calculate the SOC conversion efficiency indication SOCc, accordingly it would also be acceptable, as calculated values for the forecast SOC (p_SOC(i)) which are obtained in the step S10, to use the values SOCc=SOCc_j in the step S9 for each subdivided section.

In this manner, with the control device for a hybrid vehicle according to the first preferred embodiment of the present invention, the guide route to the target location is subdivided into a number of sections, the vehicle speed p_vsp and the drive/brake power command value p_tTd for each subdivided section of the guide route are forecast based upon the road environment information which is detected by the navigation device 33, and the operational point for the engine and the motors at which the fuel utilization efficiency is good is provisionally determined based upon the forecast vehicle speed p_vsp and the forecast drive/brake power command value p_tTd for each subdivided section and the SOC conversion efficiency indication SOCc which has been set to the initial value SOCc_0 of battery SOC. Next, the SOC at the target location is forecast based upon this provisional operating point for the engine and the motors in each subdivided section and the currently detected value d_SOC of the SOC, and the SOC conversion efficiency indication SOCc is converged to its converge value SOCc_j until the forecast SOC (p_SOC) at the target location approximately agrees with the target SOC (t_SOC) at the target location. And a drive/brake power command value d_tTd is calculated by table lookup from a drive/brake power command value table which is set in advance, based upon the detected vehicle speed value d_vsp and the detected accelerator pedal opening amount value d_acc, and the final operational point for the engine and the motors is determined based upon the detected vehicle speed value d_vsp, the calculated value d_tTd of the drive/brake power command value, and the converged value SOCc_j of the SOC conversion efficiency indication SOCc.

According to this control device for a hybrid vehicle in the first preferred embodiment of the present invention, the SOC conversion efficiency indication SOCc is introduced, the vehicle speeds and the drive/brake power command values over the guide route are forecast based upon the road environment information which is detected by the navigation device, and an operational point for the engine and the motors at which the fuel utilization efficiency is good is provisionally determined, in order to attain the target SOC at the target location. Due to this, it is possible to keep the fuel consumption up to the target location at its minimum limit value when the calculated values of the detected vehicle speed values and the drive/brake power command values up to the target location respectively agree with the forecast vehicle speeds and the forecast drive/brake power values. Furthermore, since when actually determining upon the operational point for the engine and the motors and travelling, the proper operational point is calculated by utilizing the calculated values of the detected vehicle speed value and the drive/brake power command control value, instead of the forecast vehicle speed and the forecast drive/brake power command value, accordingly it never happens that an operational point is chosen at which the utilization of fuel is poor, even if the actual values of the vehicle speed and the drive/brake power command value deviate from their forecast values, and thus it is possible to maintain the effect of reduction in fuel consumption.

Furthermore, when the state of charge of the battery 15 is high, it is possible to implement an operational point at which the efficiency of utilization of fuel is high by economizing upon the amount of fuel which is required for charging the battery, by setting the SOC conversion efficiency indication SOCc at a high value so that the amount of charge supplied into the battery 15 is low. Conversely, when the state of charge of the battery 15 is low, it is possible to implement an operational point at which the amount of charge supplied into the battery 15 is high by setting the SOC conversion efficiency indication SOCc at a low value. In other words, since when the state of charge of the battery 15 is high, priority is accorded to efficiency of utilization of fuel over battery charging, while when the state of charge of the battery 15 is low, priority is accorded to battery charging over efficiency of utilization of fuel, accordingly it is possible to enhance the efficiency of utilization of fuel while managing the state of charge of the battery 15 at a desired state.

Furthermore, the SOC conversion efficiency indication SOCc is set based upon the road environment information about the route to be travelled. Since generally a hybrid vehicle accumulates electrical energy by regeneration of potential energy when the vehicle is descending down a slope, it is possible to reduce the fuel consumption by regulating the state of charge of the battery, based upon information that to the route to be travelled involves a substantial descent, by setting the SOC conversion efficiency indication SOCc to a high value in consideration of the share of energy which will be reaped due to regeneration when the vehicle is descending down the slope. Furthermore, with a hybrid vehicle in which either only an electric motor, or alternatively both an electric motor and an internal combustion engine, can be utilized as sources of drive power, it is necessary to maintain the drive power over a long time period in a situation in which the vehicle continues to ascend a slope. In such circumstances, it is desirable to get the state of charge of the battery in advance to a high value. Accordingly, based upon information that to the route to be travelled involves a substantial ascent, the SOC conversion efficiency indication SOCc is set to be small in consideration of the amount of energy which will be expended when ascending the slope, so that, by getting the state of charge of the battery 15 to a high level, it becomes possible to maintain the drive power of the vehicle over a long time period while ascending the slope. In this manner, it is possible to enhance the efficiency of utilization of fuel by using road environment information regarding the route to be travelled by the vehicle, and it is possible to improve the drive power characteristics of the vehicle.

With a conventional hybrid vehicle, the efficiency of consumption of fuel is bad when maintaining the state of charge of the battery during a long traffic congestion. However, with the control device for a hybrid vehicle according to this first preferred embodiment of the present invention, since the SOC conversion efficiency indication SOCc is set in consideration of traffic congestion information in real time which has been obtained by the navigation device, accordingly it is possible to foresee the traffic congestion in advance, and to increase the SOC by setting the SOC conversion efficiency indication SOCc to a low value during traffic congestion. By doing this, it is possible to anticipate an enhancement of the efficiency of fuel utilization. Furthermore, by setting the SOC conversion efficiency indication SOCc in consideration of the traffic congestion information, it is possible to bring the SOC close to its target value at a specified point.

—The Second Preferred Embodiment—

Another method for calculating the SOC conversion efficiency indication SOCc which is utilized in a second preferred embodiment of the control device for a hybrid vehicle according to the present invention will now be explained. It is to be noted that, since the physical structure of the control device in this second preferred embodiment is the same as in the case of the first preferred embodiment as shown in FIGS. 1 and 2, accordingly the explanation and illustration thereof will herein be omitted. However, the function with which the controller 16 is endowed is different.

Figure 9:
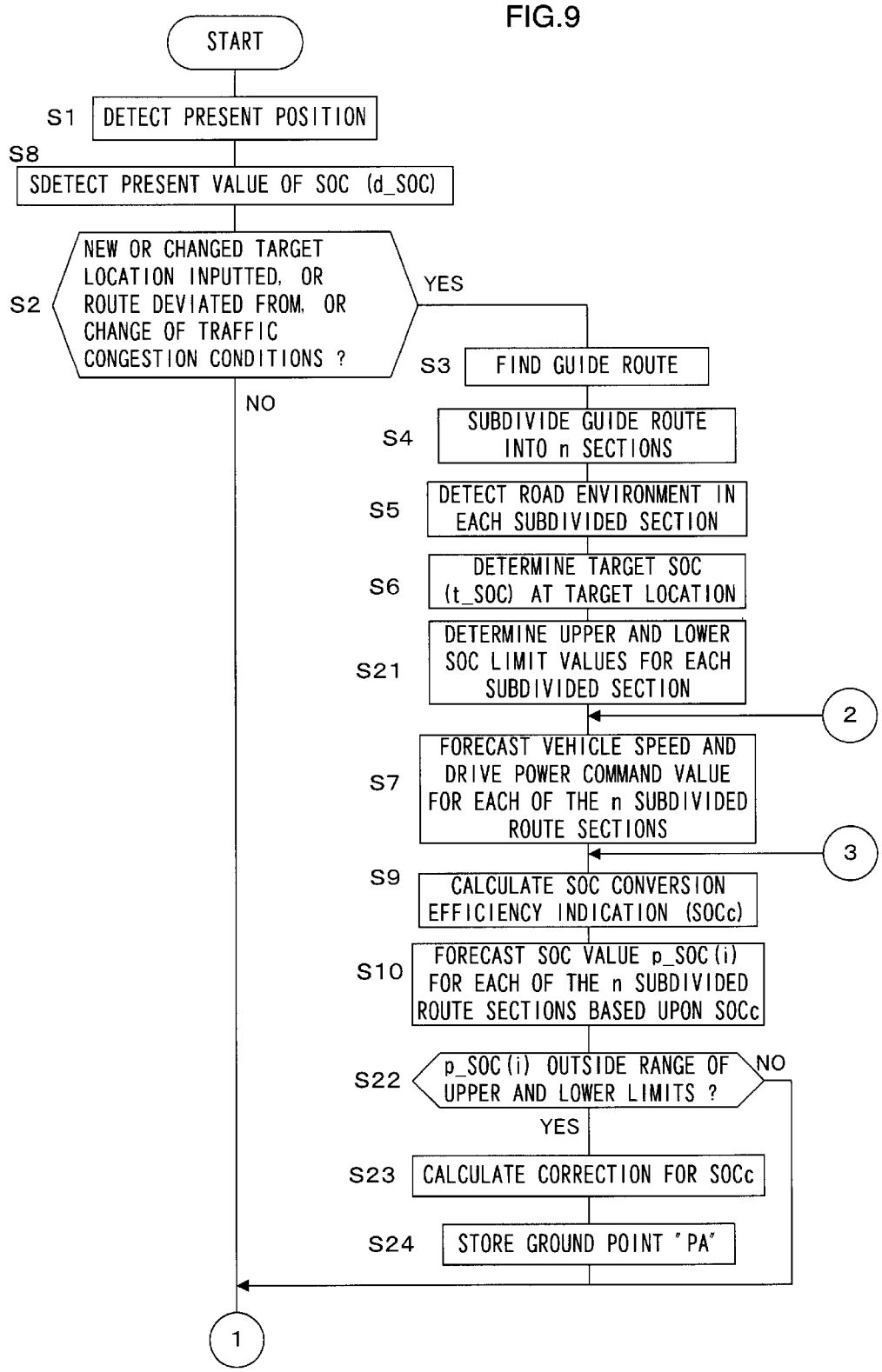
FIG. 9 is a flow chart showing the control flow of a vehicle control program of the second preferred embodiment of the present invention.
Figure 10:
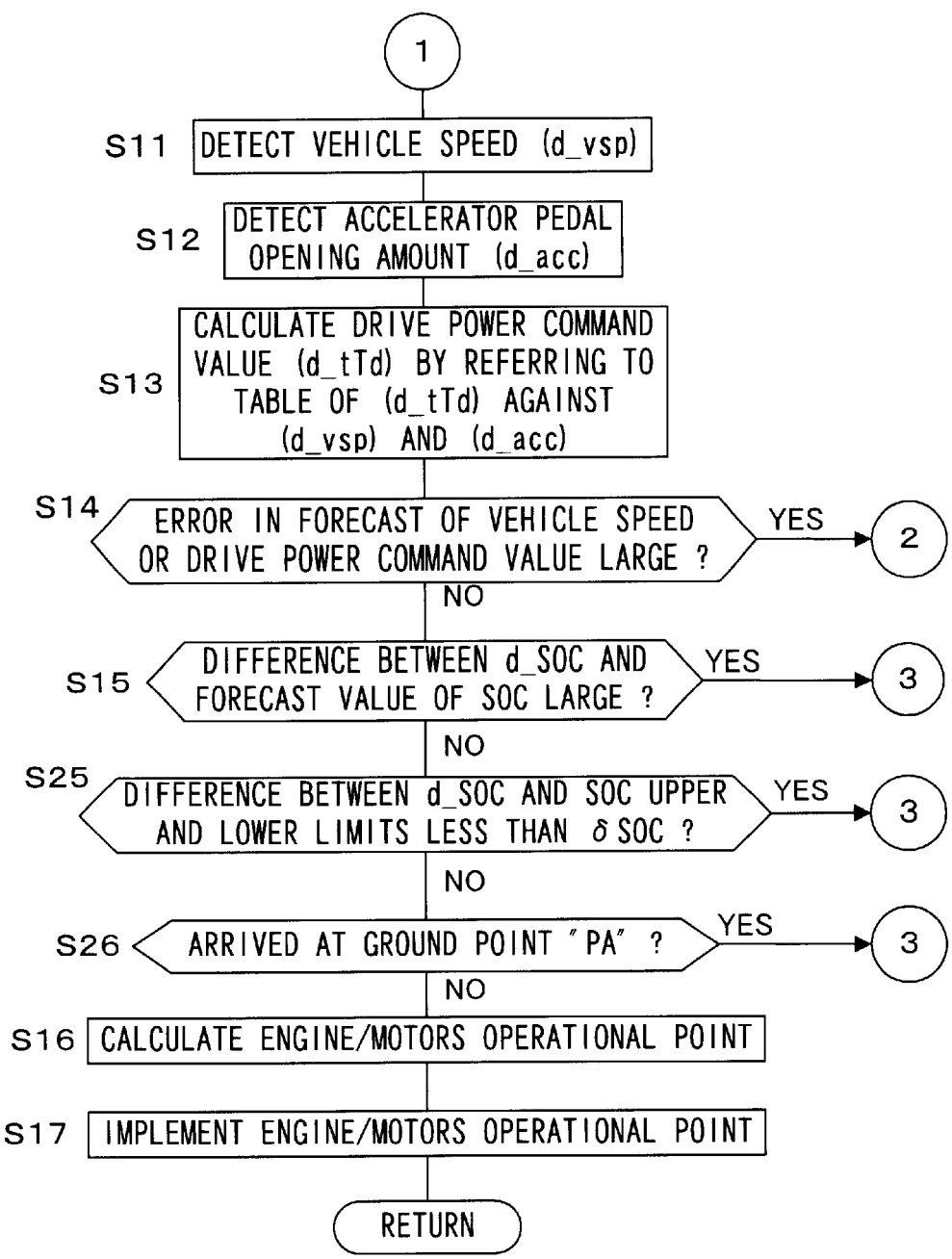
FIG. 10 is a flow chart continuing on from FIG. 9, showing the further flow of this vehicle control program of the second preferred embodiment.

FIGS. 9 and 10 are flow charts showing the flow of a vehicle control program which includes this alternative method for calculating the SOC conversion efficiency indication SOCc, according to the second preferred embodiment of the present invention. The operation of the control device for a hybrid vehicle according to this second preferred embodiment of the present invention will now be described with reference to these flow charts. It is to be noted that, since many steps in these flow charts of FIGS. 9 and 10 are identical to corresponding steps in the flow charts of FIGS. 7 and 8, accordingly the same step numbers will be appended to them, and the explanation will principally concentrate upon the points of difference between the first and the second preferred embodiments.

The vehicle controller 16 executes this control program repeatedly at predetermined intervals. First, in a step S1 of FIG. 9, the present vehicle position is detected, and then the flow of control proceeds to a step S8. In this step S8, the present value of SOC (d_SOC) is detected, and then the flow of control proceeds to a step S2. In this step S2, it is judged, as described above in connection with the first preferred embodiment, as to whether or not a new input or change of target location, or a deviation from the guide route, or a change in traffic congestion conditions has taken place. If any of a new input or change of target location, or a deviation from the guide route, or a change in traffic congestion conditions has taken place, then the flow of control proceeds to a next step S3, while if none of these occurrences has taken place then the flow of control is transferred to a step S11 (refer to FIG. 10).

In the step S3, a guide route to the target location is found, and then the flow of control proceeds to a next step S4. In this step S4, as described above in the first preferred embodiment, the guide route to the target location is subdivided into m sections way(j), where j=1~m, and furthermore, by dividing each section way(j) into p portions, the guide route to the target location is then further subdivided into n (=m.p) subsections way(i), where i=1~n. In the next step S5, various features of the road environment in each subdivided section way(j) are detected, such as the average slope, the positions of intersection points, the radius of curvature, the altitude and the like. When these features of the road environment have been detected for each subdivided section way(j), then the flow of control proceeds to a next step S6. In this step S6, as described above in connection with the first preferred embodiment, a target SOC (t_SOC) at the target location is determined, based upon the road environment in each subdivided section way(j). When the target SOC (t_SOC) has been determined, the flow of control proceeds to a step S21.

Figure 11:
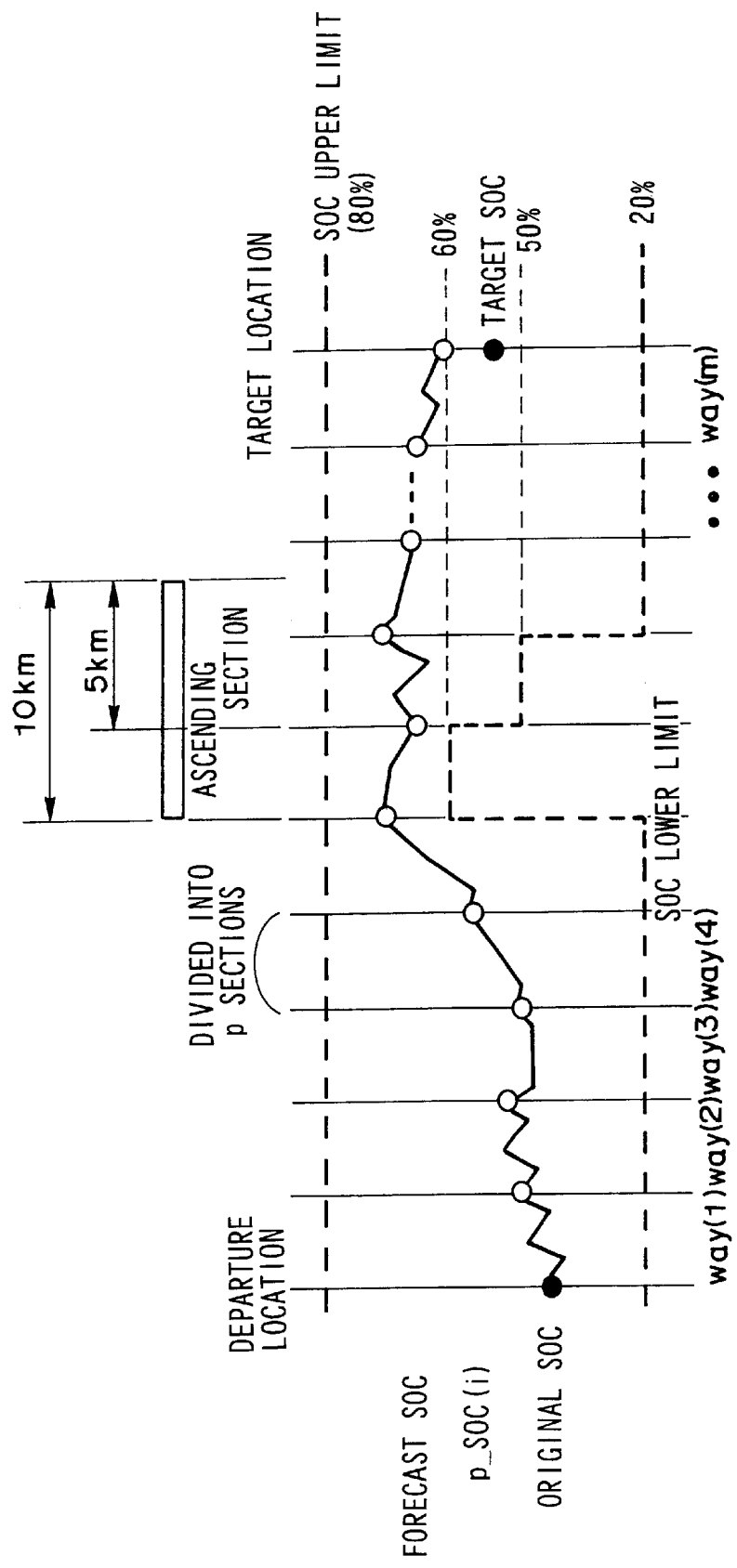
FIG. 11 is a figure for explanation of a setting method for upper and lower limit values for the SOC.

In this step S21, upper and lower limit values are set for the SOC according to the road environment for each section way(j) in consideration of the power characteristics of the vehicle. For example if, as shown in FIG. 11, it is anticipated that an ascent will continue over 5 km from a section way(k) partway along the route, in order to maintain sufficient drive power from the electric motors 1 and 4, the SOC lower limit value for the section way(k) is set to 50%, while if the ascent will continue over 10 km then the SOC lower limit value is set to 60%. It is to be noted that, in principle, the upper and lower limit values for SOC over each subdivided section are set to 20% or below and to 80% or above, as shown in FIG. 11, in order to protect the battery. Furthermore, it would also be acceptable to set the upper and lower limit values for SOC to be the same over all the sections, or to set them for each section way(i) individually. Yet further, it would be acceptable to set them for any point upon the guide route. Of course, it would also be possible only to set an upper limit value, or only to set a lower limit value.

Next, in a step S7, as described above in the first preferred embodiment, the vehicle speed p_vsp(i) and the drive/brake power command value p_tTd(i) for each subdivided section way(i) between the present position and the target location are forecast based upon the road environment for each subdivided section way(i) detected in the step S5. The forecast of the vehicle speed p_vsp(i) and of the drive/brake power command value p_tTd(i) are made in the same manner as described above in connection with the first preferred embodiment, and therefore the details thereof will here be omitted. When the vehicle speed p_vsp(i) and the drive/brake power command value p_tTd(i) for each subdivided section way(i) have been forecast, the flow of control proceeds to a next step S9.

In this step S9, the SOC conversion efficiency indication SOCc is calculated. Next in a step S10, the value of SOC (p_SOC(i)) for each subdivided section way(i) is forecast, based upon the SOC conversion efficiency indication SOCc which was calculated in the step S9, the forecast vehicle speed p_vsp(i) and the forecast drive/brake power command value p_tTd(i) which was obtained in the step S7. When the SOC (p_SOC(i)) for each subdivided section way(i) has been forecast, the flow of control proceeds to a next step S22. The method by which this forecast is performed is the same as described above in the first preferred embodiment, and therefore the details thereof will here be omitted.

In this step S22, it is judged as to whether or not the value of SOC (p_SOC(i)) for each subdivided section way(i) which was forecast in the step S10 is outside the range of the upper and lower limit values which was set in the step S21. If the result of this judgement is that the value of SOC (p_SOC(i)) is outside the range of the upper or lower limit values, then the flow of control proceeds to a step S23, while if the value of SOC (p_SOC(i)) is not outside the range of the upper and lower limit values then the flow of control is transferred to a step S11.

If the forecast value of SOC (p_SOC(i)) is outside the range of the upper or lower limit values, then in the step S23, a correction calculation for the SOC conversion efficiency indication SOCc is performed. For example, if the forecast value of SOC (p_SOC(i)) is lower than its lower limit value at some point PA en route to the target location, as shown by the line ① in FIG. 12, then the SOC conversion efficiency indication SOCc is reduced by being corrected according to the above described Equation (2) until the forecast value of SOC (p_SOC(i)) no longer falls below its lower limit value (as per the line ② in FIG. 12). And, conversely, if the forecast value of SOC (p_SOC(i)) is greater than its upper limit value at some point, then the SOC conversion efficiency indication SOCc is increased by being corrected according to the above described Equation (1) until the forecast value of SOC (p_SOC(i)) no longer rises above its upper limit value. However, if in the process of correction the forecast value of SOC (p_SOC(i)) is not within the range of the upper or lower limit values, then the SOC forecast value p_SOC(i) which is closer to the present position of the vehicle (the one for which the value of i is the smaller) is used preferentially, and the SOC conversion efficiency indication SOCc is corrected according to the above Equation (1) or Equation (2) so as to be within the range of the upper and lower limit values. When the correction calculation for SOC conversion efficiency indication SOCc has been performed, the flow of control continues to a next step S24.

Figure 12:
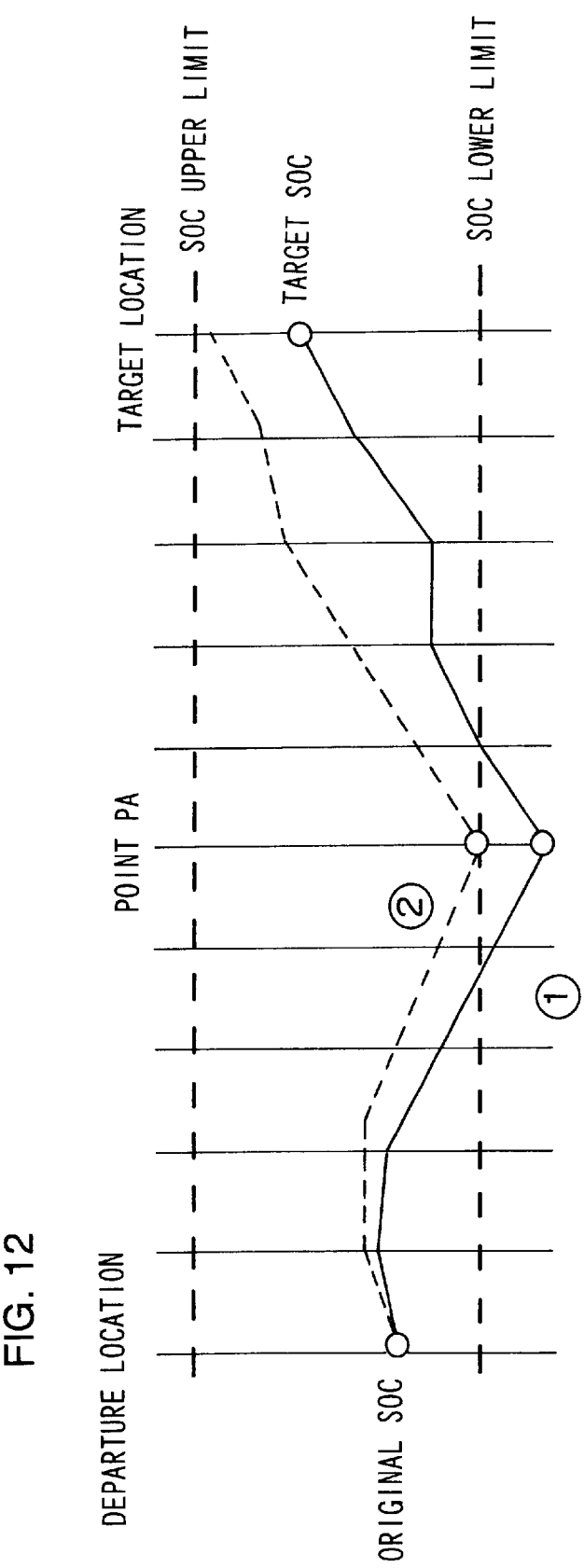
FIG. 12 is a figure for explanation of a correction method for the SOC conversion efficiency indication.

In this step S24, the point for which the forecast SOC (p_SOC(i)) for each section way(i) has come to be included within the upper or lower limit for SOC, for example the point for which, as shown in FIG. 12, the curve of variation of the forecast SOC (p_SOC(i)) is closest to the upper or lower limit for SOC, or the intersection point "PA" of the curve of variation of the forecast SOC (p_SOC(i)) with the upper or lower limit value for SOC, is stored. When this point "PA" is stored, the flow of control proceeds to the step S11 (refer to FIG. 10). Since at this time the forecast SOC (p_SOC(i)) on the line ② at the target location does not agree with the target SOC (t_SOC), accordingly, if the SOC conversion efficiency indication SOCc for which correction calculation was performed in the step S23 is used up to the target location, the actual SOC at the target location comes not to agree with the target SOC (t_SOC). Accordingly, the SOC conversion efficiency indication SOCc which was calculated in the step S23 is used until the vehicle arrives at the point PA. On the other hand, after it has been decided (in a step S26 which will be described hereinafter) that the vehicle has arrived at the point PA, in the step S9 the SOC conversion efficiency indication SOCc is calculated again, and, based upon this re-calculated value, the operational point for the engine 2 and the motors 1 and 4 is improved by being re-determined. By doing this, it is possible to bring the actual SOC at the target location to agree almost perfectly with the target SOC (t_SOC).

Next in the step S11 (refer to FIG. 10), the vehicle speed d_vsp is detected by the vehicle speed sensor 23, and then the flow of control proceeds to a next step S12. In this step S12, the accelerator pedal opening amount d_acc is detected by the accelerator pedal sensor 22, and then the flow of control continues to a next step S13. In this step S13, the drive/brake power command value d_tTd corresponding to the detected values of the vehicle speed d_vsp and of the accelerator pedal opening amount d_acc is calculated by table lookup from a drive/brake power command value table based upon the vehicle speed and the accelerator pedal opening amount which is set in advance.

In a next step S14, it is judged as to whether or not, at the end point of each subdivided section way(i), either of, for example, the deviation between the average vehicle speed d_vsp(i) and the forecast vehicle speed p_vsp(i), and the deviation between the average drive/brake power command value d_tTd(i) and the forecast drive/brake power command value p_tTd(i), is greater than a respective standard judging value therefor, for each subdivided section. If either the deviation of the average vehicle speed d_vsp(i) or the deviation of the average drive/brake power command value d_tTd(i) is greater than its respective standard judging value, then the flow of control returns to the step S7, and the forecast vehicle speed p_vsp(i) and the average drive/brake power command value p_tTd(i) are re-calculated. On the other hand, if the deviations of the forecast values of the vehicle speed and the drive/brake power command value from the actual values are less than the standard judging values therefor, then the flow of control proceeds to a next step S15.

Moreover, as an indication of the total deviation; it is possible to use the method of the above described Equation (3) in which a total ERR_1 is obtained which is the weighted sum of the squares of the errors in the vehicle speed and the squares of the errors in the drive/brake power command values, or the method of the above described Equation (4) in which a total ERR_2 is obtained which is the sum of the squares of the deviations of a value which corresponds to the power.

In the next step S15, at the endpoint of each subdivided section way(i), it is judged as to whether or not the deviation between the current value of SOC (d_SOC) and the forecast SOC (p_SOC(i)) is greater than a standard judging value. If in this step it is judged that the deviation between the current SOC (d_SOC) and the forecast SOC (p_SOC(i)) is greater than the standard judging value therefor, then the flow of control returns to the step S9, and the SOC conversion efficiency indication SOCc is re-calculated. On the other hand, if it is judged that the deviation between the forecast SOC (p_SOC(i)) and the current SOC (d_SOC) is less than the standard judging value, then the flow of control proceeds to a next step S25. It is to be noted that it would also be possible to use, as an indication of deviation, for example, the quantity ERR_3 defined by the above Equation (5).

In this step S25, it is judged as to whether or not the difference between the current value of SOC (d_SOC) and the upper and lower limit values for SOC which were set in the step S21 is less than a predetermined value δSOC. Here, a suitable value for determining proximity of SOC to its upper and lower limit values is used for this predetermined value δSOC. If it is judged that the difference between the current value of SOC (d_SOC) and the upper and lower limit values for SOC is less than the predetermined value δSOC, then the flow of control returns to the step S9, and the SOC conversion efficiency indication SOCc is re-calculated. On the other hand, if it is judged that the difference between the current value of SOC (d_SOC) and the upper and lower limit values for SOC is greater than the predetermined value δSOC, then the flow of control proceeds to a next step S26.

In this step S26, it is judged as to whether or not the vehicle has yet arrived at the point PA. Here, the point PA is the point at which the current value of SOC (d_SOC) arrives at the upper or lower limit value for SOC which was set in the step S21, in other words is the point which was stored in the step S24. If it is judged that the vehicle has arrived at the point PA, then the flow of control returns to the step S9, and the SOC conversion efficiency indication SOCc is re-calculated. On the other hand, if it is judged that the vehicle has not yet arrived at the point PA, then the flow of control proceeds to a next step S16.

In this step S16, a proper operational point for operation of the engine 2 and the motors 1 and 4 is calculated based upon the value SOCc_j to which the SOC conversion efficiency indication SOCc has converged, the present detected value d_vsp of vehicle speed, and the calculated value d_tTd for the drive/brake power command value. Next in a step S17, the torque of the engine 2, the torques of the motors 1 and 4, the gear ratio of the stepless transmission 5, and the engagement and disengagement of the clutch 3 are controlled so as to implement the engine/motor operational point determined above.

In this manner, with the control device for a hybrid vehicle according to the second preferred embodiment of the present invention, the upper and lower limit values for SOC are set according to the road environment in each subdivided section way(i) in consideration of the drive characteristics of the vehicle, and the SOC conversion efficiency indication SOCc and a forecast SOC (p_SOC(i)) for each subdivided section way(i) are calculated. If the forecast SOC (p_SOC(i)) for each subdivided section way(i) is outside the range of the upper or lower limits for SOC, then the SOC conversion efficiency indication SOCc is re-calculated so as to bring it within the range of the upper and lower limits for SOC, and the point PA at which the curve of variation of the forecast SOC (p_SOC(i)) for each subdivided section way (i) comes closest to the upper or lower limit value for SOC, or the intersection point PA between the curve of variation of the forecast SOC (p_SOC(i)) and the upper or lower limit value for SOC, is stored. While the vehicle is operated with the engine/motor operational point determined based upon the SOC conversion efficiency indication SOCc, when the current value of SOC (d_SOC) arrives in the vicinity of the upper or lower SOC limit value or at the above described point PA, the calculation of the SOC conversion efficiency indication SOCc thereafter is corrected, the engine/motor operational point is determined based upon the new SOC conversion efficiency indication SOCc, and the vehicle proceeds towards the target location. By doing this, it is possible to attain the target SOC at the target location while enhancing the efficiency of utilization of fuel up to the target location, and while controlling the SOC to be within the limit value range which has been set.

—The Third Preferred Embodiment—

Yet another method for calculating the SOC conversion efficiency indication SOCc which is utilized in a third preferred embodiment of the control device for a hybrid vehicle according to the present invention will now be explained. It should be understood that, since the physical structure of the control device in this third preferred embodiment is the same as in the case of the first preferred embodiment as shown in FIGS. 1 and 2, accordingly the explanation and illustration thereof will herein be omitted. However, the function with which the controller 16 is endowed is different. That is, the driving conditions forecast function 16a (refer to FIG. 2) of the first preferred embodiment for forecasting the vehicle speed and the drive/brake power command value for each subdivided section up to the target location is not required, so that with this third preferred embodiment it is possible to reduce the burden of calculation.

Figure 13:
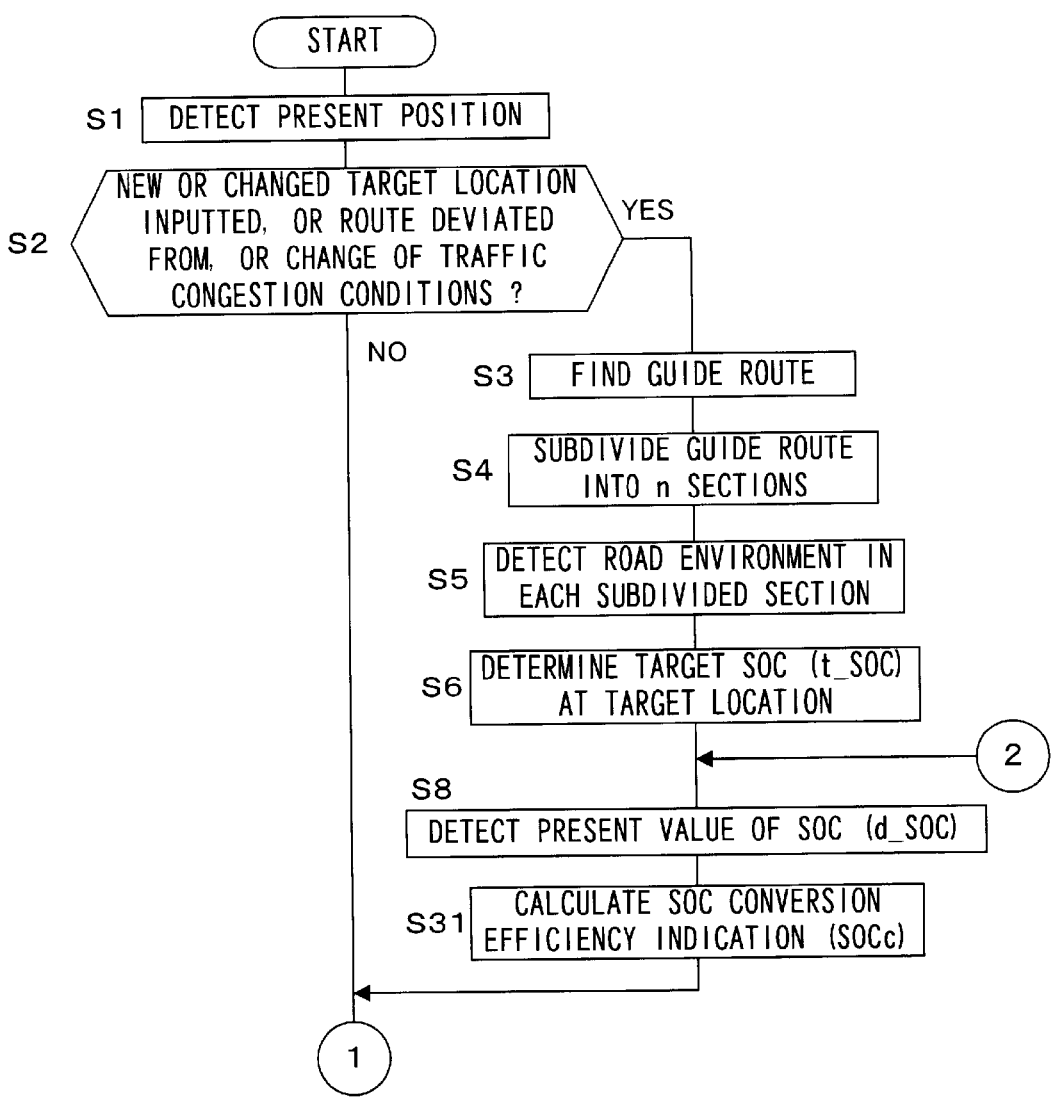
FIG. 13 is a flow chart showing the control flow of a vehicle control program of the third preferred embodiment of the present invention.
Figure 14:
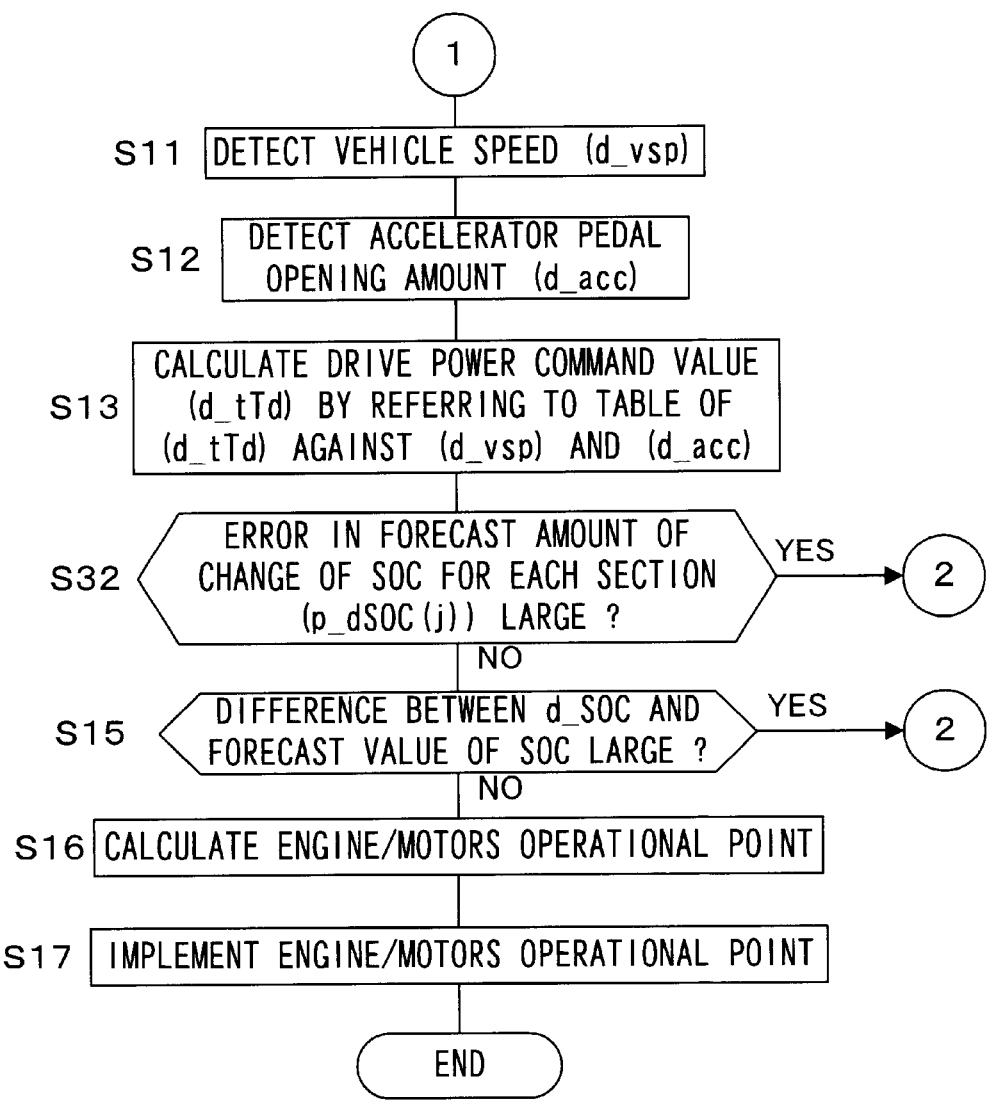
FIG. 14 is a flow chart continuing on from FIG. 13, showing the further control flow of this vehicle control program of the third preferred embodiment.

FIGS. 13 and 14 are flow charts showing the flow of a vehicle control program which includes this alternative method for calculating the SOC conversion efficiency indication SOCc, according to the third preferred embodiment of the present invention. The operation of the control device for a hybrid vehicle according to this third preferred embodiment of the present invention will now be described with reference to these flow charts. It is to be noted that, since many steps in these flowcharts of FIGS. 13 and 14 are identical to corresponding steps in the flow charts of FIGS. 7 and 8, accordingly the same step numbers will be appended to them, and the explanation will principally concentrate upon the points of difference between the first and the third preferred embodiments.

The vehicle controller 16 executes this control program repeatedly at predetermined intervals. First, in a step S1 of FIG. 13, the present vehicle position is detected, and then the flow of control proceeds to a step S2. In this step S2, it is judged as to whether or not a new input or change of target location, or a deviation from the guide route, or a change in traffic congestion conditions has taken place. If any of a new input or change of target location, or a deviation from the guide route, or a change in traffic congestion conditions has taken place, then the flow of control proceeds to a next step S3, while if none of these occurrences has taken place then the flow of control is transferred to a step S11 (refer to FIG. 14).

In the step S3, a guide route to the target location is found, and then the flow of control proceeds to a next step S4. In this step S4, the guide route to a target location is subdivided into m sections way(j), where j=1~m, by taking points which are characterized by particular features of the road environment as sectional points as described above. In the next step S5, various features of the road environment in each subdivided section way(j) are detected, such as the average slope, the positions of intersection points, the radius of curvature, the altitude and the like. When the road environment has been detected, the flow of control proceeds to a next step S6. In this step S6, a target SOC (t_SOC) at the target location is determined, based upon the road environment in each subdivided section way(j), as described above. When the target SOC (t_SOC) has been determined, the flow of control proceeds to a step S8.

In this step S8, the present value of SOC (d_SOC) is detected, and then the flow of control proceeds to a next step S31. In this step S31, a SOC conversion efficiency indication SOCc is calculated. First, an operational pattern is hypothesized for each road environment. Amount of SOC change data (MAP2DSOC) per unit distance when operating according to the hypothesized pattern at the SOC conversion efficiency indication SOCc is stored in advance in the memory. A SOC change amount p_dSOC(j) corresponding to the SOC conversion efficiency indication SOCc and the road environment for each subdivided section way(j) is calculated by table lookup from this data (MAP2DSOC), and a forecast SOC (p_SOC(j)) for each subdivided section way(j) and a forecast SOC (p_SOC(m)) at the target location are obtained by integrating the SOC change amount p_dSOC(j) for each subdivided section way(j) while taking the current value of SOC (d_SOC) as an initial value. This calculation is performed until the forecast SOC (p_SOC(m)) at the target location approximately agrees with the target SOC (t_SOC) at the target location, and when they both approximately agree with one another, the current SOC conversion efficiency indication SOCc is taken as the final value of the SOC conversion efficiency indication SOCc. When the calculation of SOC conversion efficiency indication SOCc has been completed, the flow of control proceeds to a next step S11.

In the step S11 (refer to FIG. 14), the vehicle speed d_vsp is detected by the vehicle speed sensor 23, and then the flow of control proceeds to the next step S12. In this step S12, the accelerator pedal opening amount d_acc is detected by the accelerator pedal sensor 22, and then the flow of control proceeds to the next step S13. In this step S13, the drive/brake power command value d_tTd corresponding to the detected values of the vehicle speed d_vsp and of the accelerator pedal opening amount d_acc is calculated by table lookup from a drive/brake power command value table based upon the vehicle speed and the accelerator pedal opening amount which is set in advance. When this drive/brake power command value d_tTd has been thus obtained, the flow of control proceeds to a next step S32.

In this step S32, it is judged as to whether or not the error in the amount of change of SOC (p_dSOC(j)) for each subdivided section way(j) is large. In other words, at the endpoint of each subdivided section way(j), the actual amount of change of SOC (d_dSOC(k)) for the section way(k) (where k=j−1) which has been traversed directly before is compared with the value of the amount of change of SOC (p_dSOC(k)) which has been calculated, and if the deviation is great, then it is corrected. As the standard judging value for the deviation, for example, the quantity ERR4 obtained according to the following Equation (6) may be used:

$$\mathrm{ERR\_4} = (\mathrm{d\_dSOC}(k) - \mathrm{p\_dSOC}(k))^2 \quad (6)$$

If it is decided that the deviation is large, then the flow of control returns to the step S8 and the SOC conversion efficiency indication SOCc is re-calculated, while if it is decided that the deviation is small, then the flow of control proceeds to the step S15.

In the step S15, at the end point of each subdivided section way(j), it is judged as to whether or not the deviation between the current value of SOC (d_SOC) and the forecast SOC (p_SOC(i)) is greater than a standard judging value. If in this step it is judged that the deviation between the current value of SOC (d_SOC) and the forecast SOC (p_SOC(i)) is greater than the standard judging value therefor, then the flow of control returns to the step S9, while if it is judged that the deviation does not exceed the standard judging value, then the flow of control proceeds to a next step S16. It is to be noted that it would also be possible to use, as an indication of deviation, for example, the standard value ERR_3 defined by Equation (5) above.

In the next step S16, a proper operational point when operating the engine 2 and the motors 1 and 4 is calculated based upon the value SOCc_j to which the SOC conversion efficiency indication SOCc has converged, the present detected value d_vsp of vehicle speed, and the calculated value d_tTd for the drive/brake power command value. If at this time the detected value of SOC (d_SOC) is in the vicinity of the upper or the lower limit value which is set in advance for protection of the main battery 15, then the calculation is performed using the detected value of SOC (d_SOC) instead of the SOC conversion efficiency indication SOCc, in order to accord priority to protection of the vehicle battery 15. Next in the step S17, the torque of the engine 2, the torques of the motors 1 and 4, the gear ratio of the stepless transmission 5, and the engagement and disengagement of the clutch 3 are controlled so as to implement the engine/motor operational point determined above.

It is to be noted that it is possible to store road environment information, SOC conversion efficiency indications SOCc, and SOC change amounts relating to routes which were traversed in the past, and to forecast the SOC change amount for each subdivided section way(j) in consideration of this data relating to routes which were traversed in the past. In such a case, it is possible to forecast a more accurate SOC change amount for each subdivided section way(j).

In this manner, with this control device for a hybrid vehicle according to the third preferred embodiment of the present invention, an operational pattern is hypothesized for each road environment, and SOC variation data per unit travel distance for traverse in hypothesized operational patterns with various SOC conversion efficiency indications are stored in the memory in advance. And the SOC change amount p_dSOC(j) corresponding to the SOC conversion efficiency indication SOCc and the road environment for each subdivided section way(j) is calculated by table lookup from this SOC variation data per unit travel distance, and a forecast SOC (p_SOC(j)) for each subdivided section way (j) and a forecast SOC (p_SOC(m))) at the target location are obtained by integrating the SOC change amount p_dSOC(j) for each subdivided section way(j) while taking the current value of SOC (d_SOC) as an initial value. This calculation is performed until the forecast SOC (p_SOC (m))) at the target location approximately agrees with the target SOC (t_SOC) at the target location, and when they both approximately agree with one another, the current SOC conversion efficiency indication SOCc is taken as the final value of the SOC conversion efficiency indication SOCc. And when the engine/motor operational point is determined based upon this SOC conversion efficiency indication SOCc and the vehicle is operated based upon this operational point, the actual amount of variation d_dSOC(k) for each subdivided section way(k) and the calculated amount of variation p_dSOC(k) are compared together, and if the deviation is large then the SOC conversion efficiency indication SOCc is corrected. Furthermore, for each subdivided section way(j), the current value of SOC (d_SOC) and the forecast value of SOC (p_SOC(i)) are compared together, and if the deviation is greater than a standard decision value then the SOC conversion efficiency indication SOCc is corrected. By doing this, it is possible to attain the target SOC at the target location while enhancing the efficiency of utilization of fuel up to the target location.

The present invention is not limited to the examples presented in the embodiments described above. For example, although, in the first through the third embodiments above, it was shown by way of example that the ratio (Δbat/Δfuel) of the amount of increase of charge electrical power Δbat to the fuel increase amount Δfuel, in other words the sensitivity S, is taken as the SOC conversion efficiency indication SOCc; but in fact the SOC conversion efficiency indication SOCc is not to be considered as being limited to the sensitivity S. For example, in the case of a vehicle in which the generation of electricity is emphasized when the SOC is low, while the generation of electricity is suppressed when the SOC is high, the SOC itself may be used as the SOC conversion efficiency indication SOCc. In such a case, if the route over which the vehicle is travelling includes a downwards gradient of greater than a predetermined distance, it is desirable to correct the target SOC by reducing it relative to the detected SOC. Furthermore, it would be possible to increase the amount of correction for the SOC more, the greater is the difference between the detected SOC value and the target SOC at the target location.

It is to be noted that, in the case of an automatic drive/brake power adjustment system such as one which automatically adjusts the drive/brake power of the vehicle according to the current situation, instead of this adjustment being performed manually by the driver by stepping upon an accelerator pedal, it would be possible to obtain the same beneficial results as in the case of the above described preferred embodiments by substituting "drive/brake power command value of the automatic drive/brake power adjustment system" for "accelerator pedal opening amount" in the above description.

Although in the above described preferred embodiments of the present invention the description was given, by way of example, in terms of application to a vehicle which implemented both parallel hybrid operation with the clutch 3 engaged, and series hybrid operation with the clutch 3 disengaged, this should not be considered as being limitative of the present invention; alternatively, the present invention could also be applied, in an analogous manner, to the case of a vehicle which performed parallel hybrid operation only, or to the case of one which performed series hybrid operation only. Moreover, the present invention should not be considered as being limited to the case of a vehicle which is equipped with a stepless transmission; it could also be applied to a vehicle equipped with a step-type transmission. Furthermore, the shown position in which the transmission is disposed is not to be considered as being limitative of the present invention.

Furthermore, the electric motors 1, 4 and 10 are not to be considered as being limited to AC motors; DC motors could also be used. If DC motors are used as the electric motors 1, 4, and 10, then instead of inverters, DC/DC converters will be used.

The present invention can be applied to vehicles which utilize any type of drive system, such as front wheel drive, rear wheel drive, or four wheel drive or the like; and, moreover, it can be applied to vehicles with various forms and sources of drive power, such as ones in which an internal combustion engine drives the front wheels while an electric motor drives the rear wheels, and the like.

In the description of the various preferred embodiments of the present invention described above, it was shown by way of example that, along with finding a route to the target location and setting a target SOC (t_SOC) at the target location, also a forecast SOC (p_SOC) at the target location was obtained, and the SOC conversion efficiency indication SOCc was set so that the forecast SOC (p_SOC) at the target location comes approximately to agree with the target SOC (t_SOC) there. However, as an alternative, it would also be possible, along with setting any intermediate point partway along the guide route (instead of the above described target location) and setting a target SOC at this intermediate point, to obtain a forecast SOC at this intermediate point, and to set the SOC conversion efficiency indication SOCc so that the forecast SOC at the intermediate point comes approximately to agree with the target SOC there. In such a case, the guide route to the intermediate point would be subdivided, and for each subdivided route section a SOC variation amount and a forecast SOC and the like would be calculated. It is to be noted that in the above description the term "specified point upon the route to be travelled" includes the target location upon the guide route and any intermediate point upon the guide route.

The disclosure of the following priority application is herein incorporated by reference: Japanese Patent Application 2001-31030, filed Feb. 7, 2001.

What is claimed is:

1. A control device for a hybrid vehicle which is propelled by either an internal combustion engine or an electric motor or both, and in which electrical power is transferred between the motor and a battery, comprising:

a vehicle speed detection device which detects the speed of the vehicle;

a drive/brake power command value setting device which sets a drive/brake power command value for the vehicle;

an efficiency indication setting device which sets an efficiency indication which indicates the efficiency of utilization of fuel; and an operational point determination device which determines an operational point for the engine and the motor which makes the amount of charge into the battery smaller, the greater is the efficiency indication, based upon the vehicle speed which is detected by said vehicle speed detection device, the drive/brake power command value which is set by said drive/brake power command value setting device, and the efficiency indication which is set by said efficiency indication setting device.

2. A control device for a hybrid vehicle according to claim 1, wherein:

the efficiency indication is a battery SOC conversion value which corresponds to the amount of battery charge electrical power increase per fuel increase amount; and said operational point determination device determines an operational point for the engine and the motor at which the fuel utilization efficiency is the higher, the higher is the SOC conversion efficiency indication.

3. A control device for a hybrid vehicle according to claim 2, further comprising:

a navigation device which sets a route to be travelled and detects road environment information for the route to be travelled, wherein:

said efficiency indication setting device sets the efficiency indication based upon the road environment information for the route to be travelled.

4. A control device for a hybrid vehicle according to claim 3, further comprising:

an SOC detection device which detects the SOC of the battery;

an SOC forecasting device which forecasts the SOC at a specified point upon the route to be travelled based upon the detected SOC value which has been detected by said SOC detection device; and a target SOC setting device which sets a target SOC at the specified point, wherein:

said efficiency indication setting device sets an SOC conversion efficiency indication by making the SOC forecast value at the specified point which is forecast by said SOC forecasting device agree with the target SOC.

5. A control device for a hybrid vehicle according to claim 4, further comprising:

a route subdivision device which subdivides the route to be travelled to a specified point; and an SOC change amount forecasting device which forecasts the SOC change amounts for each subdivided section of the route to be travelled based upon the road environment information for the route to be travelled and the SOC conversion efficiency indication, wherein:

said SOC forecasting device forecasts the SOC at the specified point by integrating the forecast SOC change amounts for each subdivided section which have been forecast by said SOC change amount forecasting device, taking the present SOC detected by said SOC detection device as an initial value; and said efficiency indication setting device converges the SOC conversion efficiency indication so as to make the SOC forecast value at the specified point which is forecast by said SOC forecasting device agree with the target SOC.

6. A control device for a hybrid vehicle according to claim 5, wherein:

said SOC change amount forecasting device forecasts a SOC change amount for each subdivided section based upon the SOC conversion efficiency indication and the road environment information for each subdivided section based upon data relating to SOC variation amount per unit distance travelled when operating under each travelling pattern with various SOC conversion efficiency indications, the data being stored in advance and each travelling pattern being determined for road environment.

7. A control device for a hybrid vehicle according to claim 4, further comprising:

a route subdivision device which subdivides the route to be travelled to a specified point; and a driving conditions forecasting device which forecasts the vehicle speed and drive/brake power in each subdivided section based upon the road environment information for the route to be travelled, wherein:

said SOC forecasting device forecasts the SOC at the specified point based upon the SOC which has been detected by said SOC detection device, the SOC conversion efficiency indication which has been set by said efficiency indication setting device, and the forecast vehicle speed and forecast drive/brake power which have been forecast by said driving conditions forecasting device; and said efficiency indication setting device converges the SOC conversion efficiency indication so as to make the SOC forecast value at the specified point which is forecast by said SOC forecasting device agree with the target SOC.

8. A control device for a hybrid vehicle according to claim 7, further comprising:

an accelerator pedal opening amount detection device which detects the amount by which an accelerator pedal is actuated which defines an accelerator pedal opening amount; and a drive/brake power command value calculation device which determines a drive/brake power command value corresponding to the accelerator pedal opening amount which is detected by said accelerator pedal opening amount detection device and the vehicle speed which is detected by said vehicle speed detection device, by table lookup from a table in which drive/brake power command values are stored based upon vehicle speed and accelerator pedal opening amount which is set in advance; wherein said efficiency indication setting device resets the SOC conversion efficiency indication, when the deviation between the vehicle speed detected by said vehicle speed detection device and the forecast vehicle speed has exceeded a predetermined value, or when the deviation between the drive/brake power command value determined by said drive/brake power command value calculation device and the forecast drive/brake power command value has exceeded a predetermined value.

9. A control device for a hybrid vehicle according to claim 5, wherein:

said SOC forecasting device forecasts the SOC for each subdivided section based upon the SOC conversion efficiency indication which has been made to converge; and said efficiency indication setting device resets the SOC conversion efficiency indication when, for a subdivided section, the deviation between the SOC which has been detected by said SOC detection device and the SOC forecast value which has been forecast by said SOC forecasting device exceeds a predetermined value.

10. A control device for a hybrid vehicle according to claim 5, further comprising:

an upper and lower limit value setting device which sets an upper limit value and a lower limit value for SOC; wherein:

said SOC forecasting device forecasts the SOC for each subdivided section based upon the SOC conversion efficiency indication which has been converged by said efficiency indication setting device; and said efficiency indication setting device corrects the SOC conversion efficiency indication so that the SOC forecast value for each subdivided section comes within the range of the upper and lower limit values for SOC, when the SOC forecast value for each subdivided section which has been forecast by said SOC forecasting device falls outside the range of the upper and lower limit values for SOC which has been set by said upper and lower limit value setting device.

11. A control device for a hybrid vehicle according to claim 10, wherein:

said efficiency indication setting device resets the SOC conversion efficiency indication when the SOC forecast value for each subdivided section approaches the upper and lower limit values for SOC.

12. A control device for a hybrid vehicle according to claim 10, wherein:

said upper and lower limit value setting device sets the upper limit value and/or the lower limit value for each subdivided section, or for any point, upon said route to be travelled.

13. A control device for a hybrid vehicle according to claim 4, further comprising:

an upper and lower limit value setting device which sets an upper limit value and a lower limit value for SOC; wherein:

said efficiency indication setting device resets the SOC conversion efficiency indication when the SOC which is detected by said SOC detection device approaches the upper or lower limit values for SOC which have been set by said upper and lower limit value setting device.

14. A control device for a hybrid vehicle according to claim 7, further comprising:

a vehicle speed storage device which stores vehicle speeds over routes to be travelled, wherein:

said driving conditions forecasting device forecasts vehicle speed and drive/brake power for each subdivided section based upon past vehicle speeds which have been stored by said vehicle speed storage device.

15. A control device for a hybrid vehicle according to claim 3, wherein:

said navigation device detects road congestion information for the route to be travelled, and said efficiency indication setting device sets the efficiency indication in consideration of the road congestion information which is detected by said navigation device.

16. A control device for a hybrid vehicle according to claim 15, wherein:

said efficiency indication setting device resets the efficiency indication when the road congestion information which is detected by said navigation device changes.

17. A control device for a hybrid vehicle according to claim 3, wherein:

the environment information includes the inclination and the altitude of the route to be travelled.

18. A control device for a hybrid vehicle according to claim 3, wherein:

said efficiency indication setting device resets the efficiency indication when the vehicle deviates from the route to be travelled.

19. A control device for a hybrid vehicle which is propelled by either an internal combustion engine or an electric motor or both, and in which electrical power is between the motor and a battery, comprising:

a vehicle speed detection means for detecting the speed of the vehicle;

a drive/brake power command value setting means for setting a drive/brake power command value for the vehicle;

an efficiency indication setting means for setting an efficiency indication which indicates the efficiency of utilization of fuel; and an operational point determination means for determining an operational point for the engine and the motor which makes the amount of charge into the battery smaller, the greater is the efficiency indication, based upon the vehicle speed which is detected by said vehicle speed detection means, the drive/brake power command value which is set by said drive/brake power command value setting means, and the efficiency indication which is set by said efficiency indication setting means.

20. A control method for a hybrid vehicle for a hybrid vehicle which is propelled by either an internal combustion engine or an electric motor or both, and in which electrical power is transferred between the motor and a battery comprising;

detecting the speed of the vehicle;

setting a drive/brake power command value for the vehicle;

setting an efficiency indication which indicates the efficiency of utilization of fuel; and determining an operational point for the engine and the motor, which makes the amount of charge into the battery smaller, the greater is the efficiency indication, based upon the vehicle speed which is detected, and the drive/brake power command value and the efficiency indication which are set.

* * * * *